United States Patent
Mitchell et al.

(10) Patent No.: US 12,348,810 B2
(45) Date of Patent: Jul. 1, 2025

(54) INCORPORATING USER-RECORDED FEEDBACK INTO MEDIA BROADCAST

(71) Applicant: iHeartMedia Management Services, Inc., San Antonio, TX (US)

(72) Inventors: Albert Curtis Mitchell, Nashville, TN (US); Michael Scott Woodruff, Linden, NJ (US); Adam Michael Roberts, DeLand, FL (US); Steven Douglas Wight, Oxnard, CA (US); Siu Leung Chan, Jericho, NY (US); Jacob Earl Bolton, Howell, MI (US); Stephen William Bain, Nashville, TN (US); Qian Chang, Los Angeles, CA (US); Davis Scott Harlan, Spring, TX (US)

( * ) Notice: Subject to any disclaimer, the term of this patent is extended or adjusted under 35 U.S.C. 154(b) by 42 days.

(21) Appl. No.: 17/964,107

(22) Filed: Oct. 12, 2022

(65) Prior Publication Data

US 2024/0129573 A1    Apr. 18, 2024

(51) Int. Cl.
*H04N 21/274* (2011.01)
*H04N 21/233* (2011.01)
*H04N 21/234* (2011.01)
*H04N 21/2343* (2011.01)
*H04N 21/262* (2011.01)

(52) U.S. Cl.
CPC ....... *H04N 21/274* (2013.01); *H04N 21/2335* (2013.01); *H04N 21/23424* (2013.01); *H04N 21/234309* (2013.01); *H04N 21/262* (2013.01)

(58) Field of Classification Search
CPC ............ H04N 21/274; H04N 21/2335; H04N 21/23424; H04N 21/234309; H04N 21/262
See application file for complete search history.

(56) References Cited

U.S. PATENT DOCUMENTS

| | | | |
|---|---|---|---|
| 9,870,361 B2 | 1/2018 | Fenech et al. | |
| 10,387,889 B1* | 8/2019 | Hanna | G06Q 50/01 |
| 10,599,609 B1* | 3/2020 | Wahlstrom | H04L 65/612 |
| 2007/0288978 A1* | 12/2007 | Pizzurro | H04N 21/23412 725/135 |
| 2011/0202967 A1* | 8/2011 | Hecht | H04N 21/854 725/114 |
| 2017/0199886 A1* | 7/2017 | Perrine | G06F 16/9537 |

(Continued)

*Primary Examiner* — Benjamin R Bruckart
*Assistant Examiner* — Alexander Boyd

(57) ABSTRACT

A processing system receives a user-generated media recording, and metadata associated with the user-generated feedback, from a first device. The user-generated media recording is a recording of the public end-user captured during a live media broadcast using a public-user interface on the first device. The metadata includes information linking the user-generated media recording to the live media broadcast. The system stores the user-generated media recording and the first metadata in one or more storage devices, and transmits a version of the user-generated media recording and at least a portion of the first metadata to a private-user interface on a second device. The private-user interface is configured to receive input from a private end-user selecting the version of the user-generated media recording for broadcast during the same live media broadcast during which the user-generated media recording was created.

18 Claims, 12 Drawing Sheets

(56) References Cited

U.S. PATENT DOCUMENTS

| | | | |
|---|---|---|---|
| 2019/0058928 A1* | 2/2019 | Halper | H04N 21/26258 |
| 2019/0200054 A1* | 6/2019 | Dharmaji | H04N 21/236 |
| 2020/0162796 A1* | 5/2020 | Azuolas | H04L 65/65 |

* cited by examiner

Method 130

Method 160

Talkback Data Flow
for Android Users 180

Talkback Data Flow for iOS Users 210

Podcast Selection Screen
260

Podcast Profile Screen
270

Private-User Interface Method 300

Feedback Selection Screen
340

Feedback Information Screen
390

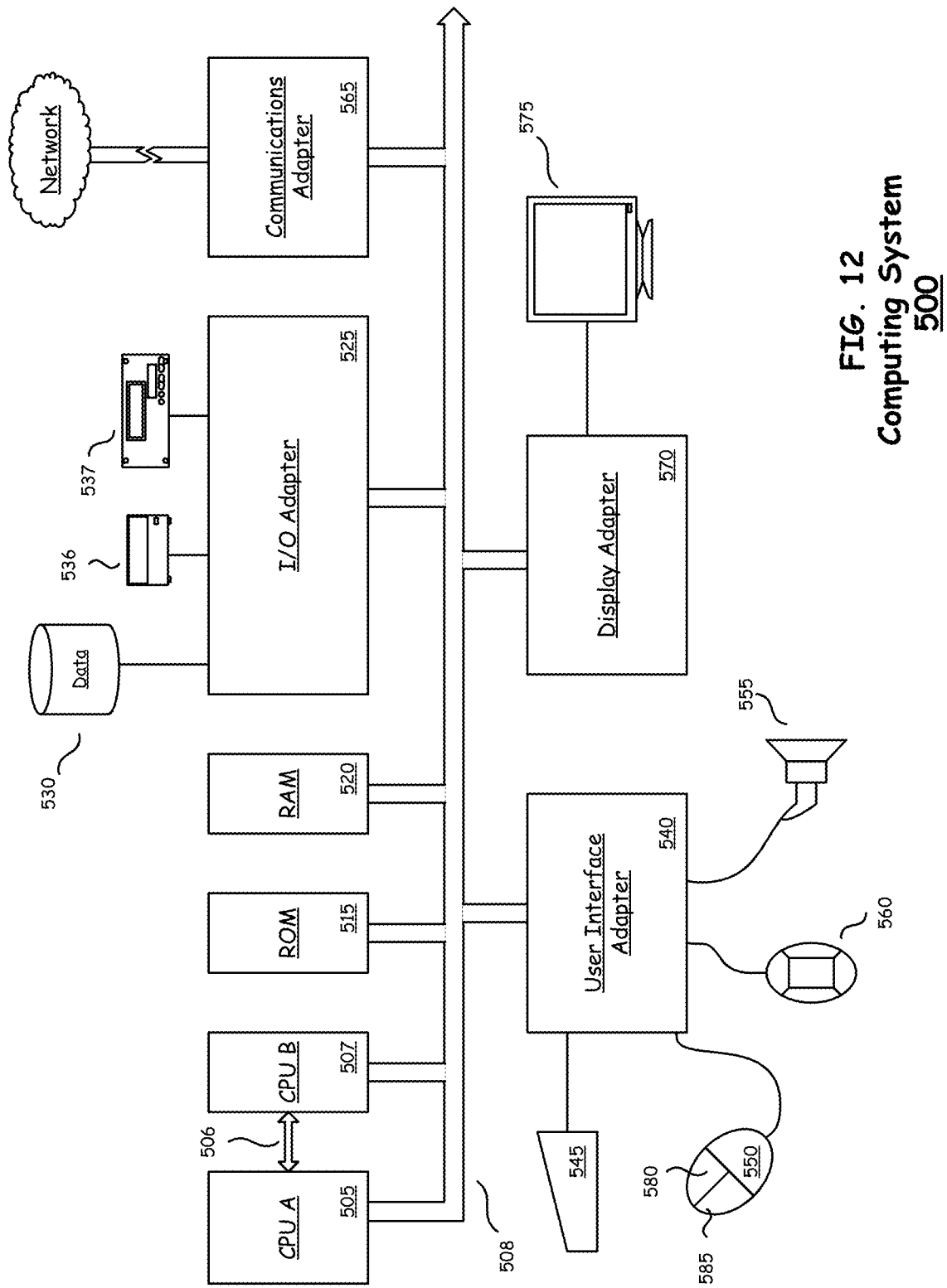

INCORPORATING USER-RECORDED FEEDBACK INTO MEDIA BROADCAST

CROSS REFERENCE TO RELATED PATENTS/APPLICATIONS

None

BACKGROUND OF THE INVENTION

1. Technical Field of the Invention

This invention relates generally to user feedback, and more particularly to incorporating user-recorded feedback into a media broadcast.

2. Description of Related Art

Historically, media consumers have been able to provide comments and feedback related to a media broadcast, podcast, or the like by phone, text, email, or other the like. So, for example, a radio listener might call in to a radio station to engage in an on-air conversation, respond to a contest announcement, requests songs, and more. In some cases, consumers are able to email feedback or comments to a particular media station, show host, or streaming service. Media consumers can also send feedback via social media accounts. The feedback sent via email or social media accounts can include recordings of the media consumer.

These conventional techniques for obtaining user feedback, however, have various shortcomings. First, retrieving feedback sent via email, text, or social media accounts can require the user to record their feedback, open an email, text, or social media application, and insert the media file into the appropriate account. Second, the user recording the feedback is often responsible for assuring the media file including the user-recorded feedback satisfies size, format, and other messaging criteria. Also, when recording the audio or audio-visual user feedback, the user would need to manually pause or mute the media show to keep the media show's audio content from being included in the audio recording. A similar problem can be observed when people call into a radio show without turning down the volume on their radio.

Once the message including the feedback arrives at its destination, the message is usually put into a delivery queue, such as an email or text inbox, where the message sits for an indeterminate amount of time before being acted upon. In current systems, access to the queued messages often requires the message recipient to run an email or messaging program to retrieve the feedback, and sometimes even requires the message recipient to run a separate media viewer application to view the feedback. Even in cases where audio or audio-video feedback is provided and retrieved within a single application, for example a social media application, current systems lack integrated tools that allow the recipient to effectively review, categorize, evaluate, and make timely use of the audio or audio-video feedback. In fact, the human effort needed for a show's host to incorporate user-recorded feedback into a media broadcast, into a media podcast, into a show's liner, or otherwise not trivial.

In view of the above, it should be apparent that current available technologies for generating, delivering, and incorporating user-recorded feedback into media shows or broadcasts are less than perfect.

BRIEF SUMMARY OF THE DISCLOSURE

The present invention is directed to apparatus and methods of operation that are further described in the following Brief Description of the Drawings, the Detailed Description of the Invention, and the claims. Various technological improvements disclosed herein describe systems, devices, and methods that provide reduced potential for human error, improved quality, timeliness, or efficiencies relating to generating user-recorded feedback, delivering and processing user-recorded feedback, and incorporating the user-recorded feedback into media shows, such as over-the-air broadcasts, streaming broadcasts, podcasts. The technological improvements described herein can be implemented to provide a more seamless way for end users to engage with live hosts of radio stations, podcasts, and other one-to-many live broadcast events. Additional features and advantages of the claimed invention will become apparent from the following detailed description of the invention made with reference to the accompanying drawings.

BRIEF DESCRIPTION OF THE SEVERAL VIEWS OF THE DRAWING(S)

FIG. 12 is a high-level block diagram of a processing system in accordance with embodiments of the present disclosure.

DETAILED DESCRIPTION OF THE INVENTION

Figure 1:
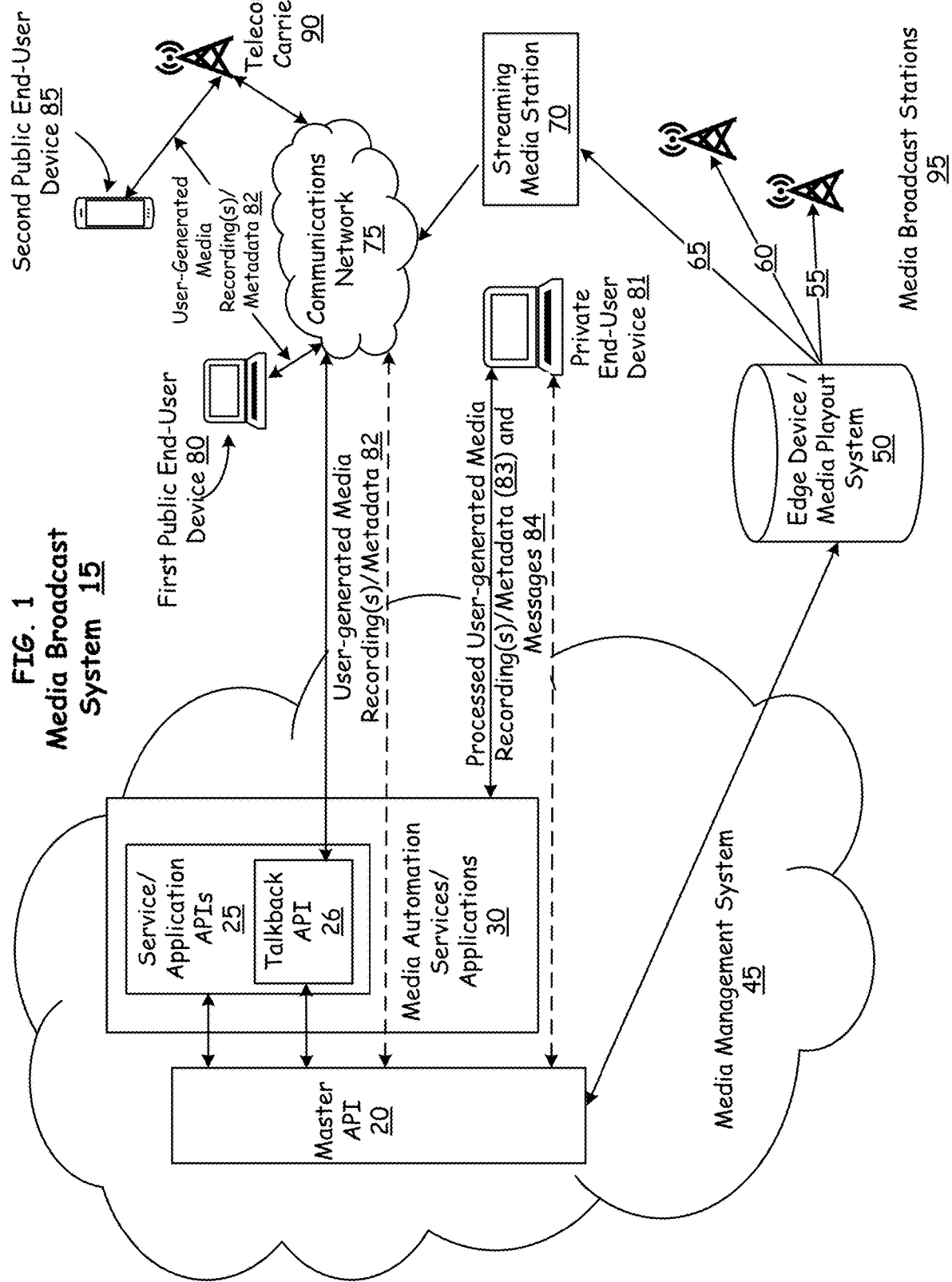
FIG. 1 is a schematic block diagram of a media broadcast system in accordance with embodiments of the present disclosure.

Various embodiments of media management and/or broadcast systems disclosed herein include a recorded-media feedback system that allows public end-users to provide feedback by creating user-generated media recordings and transmitting the recordings for storage and distribution via a specially configured application programming interface (API). In various embodiments, public end-users may record feedback during live broadcasts, or during playback of a pre-recorded broadcast, podcast, or the like. As used herein, the term "feedback" refers to comments, observations, requests, evaluations, and similar information relating to a media station, media item, media show, media podcast, media stream, media broadcast, or the like. The API performs or initiates any necessary processing and storage of the user-generated media recordings, and transmits, manages, or otherwise facilitates transmission of one or more versions of the user-generated media recordings to the appropriate radio show host, podcast host, or the like via a private end-user interface. The radio show host, podcast host, or some other private end-user, accesses the user-generated media recordings using the private end-user interface. The private end-user interface allows the private end-user to retrieve user-generated media recordings associated with shows the private end-user hosts, and to sort, select, view, listen to, edit, or insert the user-generated media recordings insert into a current broadcast or schedule them for later insertion in a podcast, as a liner, while announcing an upcoming media show, between show segments, or the like. In various embodiments, all tasks required to retrieve, manipulate, and incorporate a user-generated media recording into a media show can be performed through the private end-user interface.

At least one technical problem addressed by various embodiments discussed herein is that private end-users, such as broadcast hosts, frequently broadcast shows from various physical locations or different IP addresses, and the location from which the show is broadcast may not be known in advance of the broadcast. This makes it difficult to send message from public end-users to the host's current location. To solve this problem, the various embodiments disclosed herein process, format, organize, and link a public end-user and broadcast show information to a feedback message recorded by the public end-user, thereby allowing the recorded feedback message to be delivered to the host's current location. In some embodiments, third parties can utilize the various techniques and infrastructure disclosed herein from within other streaming and podcast applications. For example, a public end-user listening to an iHeartRadio podcast in a third party app can send message to broadcast hosts from within the third party app.

In various embodiment disclosed herein, the recorded-media feedback system and the media management and/or broadcast system are integrated through the use of one or more APIs. The APIs act as intermediaries between multiple microservice applications which, in combination, provide broadcast, scheduling, insertion, billing, and other services that enable, in some embodiments, user-generated media recordings to be incorporated into media shows that are currently being aired. As used herein, the term "microservice applications" refer to programs running on processing hardware that provide limited functionality individually, but in combination provide at least as much functionality as that provided by conventional monolithic systems. Microservices can operate independently of one another, and communicate amongst themselves and with one or more broadcast, podcast, and recorded-media feedback system s via one or more application programming interfaces. In at least some implementations, the communication is performed in real-time, or near real time. The independent operation of the microservice applications allows for media management operations for multiple broadcast systems to be more easily distributed, while the use of common or shared APIs allows coordination of the independent microservice applications, and facilitates ease of access by multiple broadcast stations, multiple public end-user interfaces, and multiple private end-user interfaces.

The near-real-time nature of the data provided by the individual microservices improves the effectiveness of automated delivery, processing, and insertion of user-generated media recordings. Unless otherwise specified, the term "near-real-time," as used herein, refers to periods of time on the order of seconds, rather than hours or minutes. For example, an event that occurs within about 60 seconds of another event is considered to be near-real-time for purposes of this disclosure, whereas an event that occurs later than about 1½ minutes after the occurrence of the other event is considered not to be near-real-time for purposes of this disclosure Various embodiments of the disclosed feedback system improve the effectiveness of inserting user-generated media recordings representative of user feedback into a show or program that is either currently being broadcast or is scheduled for later broadcast.

Microservices can be implemented using a Command and Query Responsibility Segregation (CQRS) architecture, an Event Driven architecture, sometimes referred to as an Event Sourcing architecture, or a combination of the two. The microservices themselves can be stateful, i.e., the microservices store session information associated with service requests, or stateless, i.e., the microservices do not maintain session states between requests. In some embodiments, one or more of the microservices may be implemented as a persistence microservice, which can be used to provide durable storage, or as an aggregator microservice, which is used for workflows. Communication between the microservices and an API, between one or more microservices, or between and one or more broadcast systems, can be performed. asynchronously.

A media broadcast system employing a distributed microservices architecture accessed through an application program interface (API) is described in U.S. patent application Ser. No. 17/678,243, filed Feb. 23, 2022 and entitled, "MEDIA BROADCAST CONTENT DISTRIBUTION SYSTEM," which is hereby incorporated herein by reference in its entirety.

Referring first to FIG. 1, a media broadcast system 15 will be discussed in accordance with embodiments of the present disclosure. In various embodiments, media broadcast system 15 includes media management system 45, edge device/media playout system 50, streaming media station 70, and media broadcast stations 95. Not all implementations of a media broadcast system include all elements illustrated in FIG. 1, and functionality associated with a particular element can be included in other illustrated elements. For example, media playout systems may not be implemented as an edge device. Instead, some or all of the edge-device functionality can be included media management system 45.

In various embodiments, streaming media station 70 provides streaming media to first public end-user device 80 via communications network 75, and to second public end-user device 85 via communications network 75 and telecommunications carrier 90. Public end-users 80 and public end-user device 85 transmit user-generated media recordings/metadata 82 to media management system 45. Media management system 45 processes user-generated media recordings, and in some embodiments makes the user-generated media recordings available to private end-user device 81 in near-real time. In some embodiments, media management system 45 transmits processed user-generated media recordings/metadata 83 in response to one or messages 84 transmitted by private end-user device 81. In addition, private end-user device 81 generally has access to other functionality provided by media management system 45 for incorporating user-generated media recordings into a live media broadcast, scheduling the user-generated media recordings for future broadcast, inserting the user-generated media recordings into a podcast, or the like.

Media management system 45 can include a master application program interface (API) 20, which communicates with media automation services/applications 30 through service/application APIs 25. Service/application APIs 25 include can include Talkback API 26, which can evaluate, format, process, store and route messages or message content using its own native functionality, or by triggering, initiating, or scheduling execution of various media automation services to perform those tasks on behalf of Talkback API 26. Although illustrated by a single box, media automation services/applications 30 can be, and often are, implemented in a distributed manner, with different processing devices implementing one or more individual services or applications.

In some embodiments, any or all of first public end-user device 80, second public end-user device 85, and private end-user device 81 communicate directly with Talkback API 26, as shown by solid communication arrows, bypassing master API 20. In other embodiments, any or all of first public end-user device 80, second public end-user device 85, and private end-user device 81 communicate with master API 20, which in turn handles communication with Talkback API 26 in the same way communication with the other service/application APIs is handled. In some such embodiments, private end-user device 81 can access user-generated media recordings/metadata 83 through talkback API 26, and access other media automation services/applications 30, e.g., scheduling or media insertion services, through master API 20. Although not specifically illustrated, a talkback service associated with talkback API 26 can be includes as one of multiple media automation services/applications 30.

In various embodiments, edge device/media playout system 50 is included in a media playout system, is associated with a media playout system, or includes a media playout system. Edge device/media playout system 50 transmits first media content 65 to streaming media station 70, which converts the first media content 65 into one or more media streams to be delivered to end user 80 and/or end user 85. Edge device/media playout system 50 transmits second media content 60 and third media content 55 to one or more to streaming media broadcast stations 95, which can be, for example, over-the-air radio broadcast stations. Media broadcast stations 95 broadcast second media content 60 and/or third media content 55. In various embodiments, first media content 65, second media content 60 and third media content 55 include substantially all primary and advertising content to be broadcast or streamed, so that media broadcast stations 95 and streaming media station 70 need only modulate or otherwise format the content for transmission, without altering the content itself. For example, third media content 55 may include a fully assembled broadcast, which is modulated onto a carrier frequency for over-the air transmission by one of the media broadcast stations 95.

In some such embodiments, the media broadcast stations 95 and the streaming media station 70 make no decisions about what content is to be broadcast. In other embodiments, the media broadcast stations 95 and the streaming media station 70 can insert additional or replacement content, for example station identification content required of broadcasters, local advertisements, or local primary content. However, in at least one embodiment, media broadcast stations 95 and the streaming media station 70 are not configured to insert such additional or replacement content.

In various embodiments described herein, private end-user device 81 can request insertion of one or more versions of user-generated media recording into a streaming or over the air broadcast via media management system 45. Because the private end-user device 81 can access billing, scheduling, and media incorporation functionality provided by media management system 45 through the talkback API 26, the media management system can provide various verification, scheduling, processing, and other functions, the private end-user device 81 can simply request master API 20 or talkback API 26 to insert a user-generated media item into a currently airing or future broadcast, or podcast.

In an example of operation, edge device/media playout system 50 obtains schedules, primary content, advertising content, and tertiary content from media automation services/applications 30 via master API 20, which are included in media management system 45. Edge device/media playout system 50 assembles the content into first media content 65, second media content 60 and third media content 55, which is eventually delivered to end users via streaming media station 70 or media broadcast stations 95.

Figure 2:
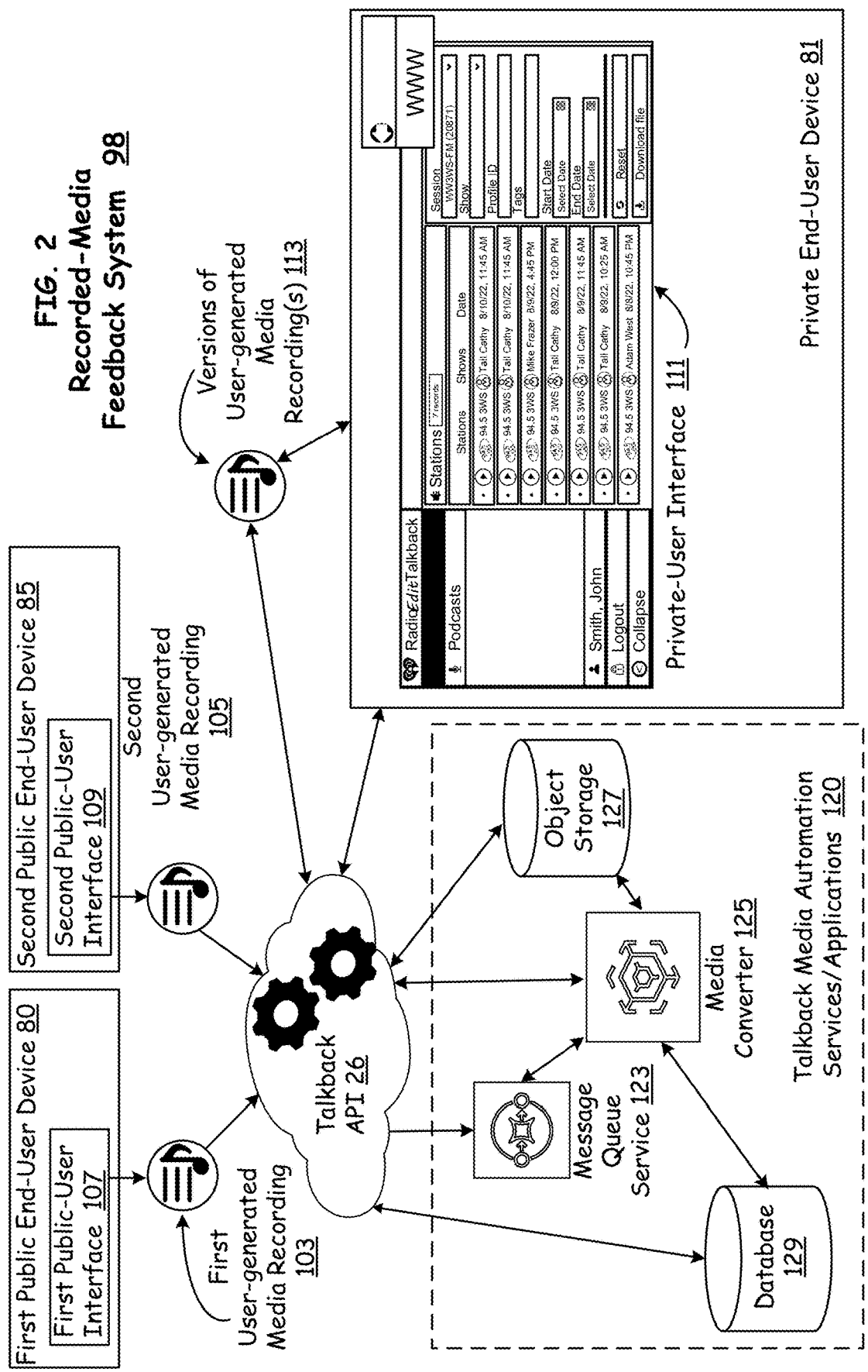
FIG. 2 is a schematic block diagram of a recorded-media feedback system in accordance with embodiments of the present disclosure.

Referring next to FIG. 2, a recorded-media feedback system 98 will be discussed in accordance with embodiments of the present disclosure. In the illustrated embodiments, recorded-media feedback system 98 includes talkback API 26, talkback media automation services/applications 120, first public end-user device 80, second public end-user device 85, and private end-user device 81.

First public end-user device 80 includes first public-user interface 107, which provides functionality allowing a first public user of first public end-user device 80 to create first user-generated media recording 103 and transmit the recording to talkback API 26. In various embodiments, first public-user interface 107 can be implemented within a mobile, desktop, or appliance app, or within a website. Second public end-user device 85 includes second public-user interface 109, which provides functionality allowing a second public user of second public end-user device 85 to create second user-generated media recording 105 and transmit the recording to talkback API 26. In various embodiments, second public-user interface 109 can be implemented within a mobile, desktop, or appliance app, or within a website. In various embodiments, both first public end-user device 80 and second public end-user device 85 include a microphone, a speaker, a camera, and a display (FIG. 12).

Private end-user device 81 includes private-user interface 111, which provides functionality allowing a private user of private end-user device 81 to communicate with talkback API 26 to obtain one or more versions of user-generated media recordings 113 from talkback media automation services/applications 120. In various embodiments, private end-user device 81 includes a microphone, a speaker, a camera, and a display (FIG. 12). Private-user interface 111 also allows users to organize, sort, filter, edit, make notes, mark recordings for sorting and later use, and otherwise manipulate the user-generated media recordings obtained via talkback API 26. In various embodiments, private-user interface 111 allows users to incorporate selected user-generated media recordings into live broadcasts of a media program, or to schedule selected user-generated recordings for later insertion into media programs to be broadcast in the future, media podcasts, liners, advertisements, or promotional media items.

As used herein, the term "user-generated media recording" refers to a media file including an audio and/or video recording of the first public end-user. User-generated media recordings are preferably, though not necessarily, created by the public end-user in response to the public end-user's interaction with a public-user interface being used to present a media program to the public end-user. The term "public end-user" refers to a listener, viewer, or other member of the public that creates the user-generated media recording. The term "private end-user" refers to a media show host, podcast host, or other similarly situated user that consumes user-generated media recordings through private-user interface 111.

Talkback media automation services/applications 120 includes database 129, message queue service 123, media converter 125, and object storage 127. In at least one embodiment, talkback media automation services/applications 120 is implemented as a collection of cloud-based micro-service applications accessible through talkback API 26. In at least one embodiment, message queue service 123 provides asynchronous service-to-service communication. Message queue service 123 stores message until the messages are processed and deleted. Each message is generally processed once, by a single consumer. Message queue service 123 can be used to buffer or batch work, or to smooth erratic workloads.

Media converter 125 provides audio/video transcoding services. For example, if a raw version of the user-generated media recording is in a Waveform Audio File format (WAV) or in an Audio Interchange File Format (AIFF), media converter 125 may convert the recording into a Broadcast Wave Format (BWF) or a Motion Picture Experts Group Layer III Audio format (MP3). In some implementations, media converter 125 can also provide audio-to-text conversion. As used herein, the terms "raw," "raw version," "raw user-generated media recording," and derivatives thereof refer to the form of the user-generated media recording upon transmission from a public end-user device to talkback API 26. Such a "raw" recording need not be unprocessed. Thus, for example, if prior to transmission the first public end-user device 80 processes a media recording captured by a public end-user into an MP3 or MP4 format, the MP3 or MP4 format can be considered by API 26 to be the "raw" version of the user-generated media recording.

Talkback media automation services/applications 120 receives raw versions of user-generated media recordings and associated metadata via talkback API 26. Talkback media automation services/applications 120 stores the raw versions of the user-generated media recordings in object storage 127 and stores the metadata associated with the raw versions of the user-generated media recordings in database 129. The metadata can include information such as a user identifier, a phone number, a media service identifier, a zip code, a media station identifier, a show identifier identifying a show that was being broadcast or streamed at the time the user-generated media recording was generated or sent, a podcast identifier identifying a podcast that was being presented to the public end-user at the time the user-generated media recording was generated, a device identifier, and/or other information that can be used to match the user-generated media recordings with a user or device that created the recording and a particular media show to which the recording most likely pertains.

In various embodiments, particular private end-users, shows, stations, or the like are pre-assigned storage locations within object storage 127 and/or database 129. In such embodiments, the metadata associated with each user-generated media recordings is used to determine where a particular user-generated media recording is to be stored. This technique can be used to allow a private-user interface being used by a particular private end-user to identify user-generated media recordings that are relevant to a particular private end-user, show, or station based on the location at which the user-generated media recordings and/or metadata are stored. This technique can front-load the processes of selecting which information is to be provided to particular private end-users.

In some embodiments, the metadata generated by a public-user interface can be minimal, and may include one or more timestamps, a station identifier, and a user or account identifier. In some such embodiments, although not specifically illustrated with respect to FIG. 2, talkback API can transmit requests for supplemental information to other media automation services/applications 30 (FIG. 1), either directly or through master API 20 (FIG. 1). The supplemental information can include demographic information associated with the identified user, a show identifier derived from the timestamp and the station identifier, a device identifier derived from the user or account identifier, demographic information associated with the derived show identifier, advertisement identifiers identifying advertisements presented with a time window before and/or after the time stamp, user preferences associated with the user or account identifier, information identifying other user-generated media recordings associated with the identified user, account or device identified device, and the like.

In some embodiments, talkback media automation services/applications 120 receives processing messages from talkback API 26, temporarily stores those processing messages in message queue service 123 and forwards them to their intended destination, generates modified versions of the user-generated media recordings using media converter 125, stores the modified versions of the user-generated media recordings in object storage 127, stores updated metadata or supplemental information associated with the "raw" and "modified" versions of user-generated media recordings stored in object storage 127, and delivers one or more versions of user-generated media recordings to private end-user device 81 via talkback API 26.

Consider the following example of recorded-media feedback system 98 in operation. First public-user interface 107, which is included in first public end-user device 80, is used to present a broadcast of a media program to a public end-user. The public end-user desires to provide feedback to the host the media program. The public end-user initiates generation of first user-generated media recording 103 during a time the broadcast of the media program is being presented via first public-user interface 107. The public end-user can record his or her feedback in an audio, video, or audio-video form using tools presented with the first public-user interface. In various embodiments, information indicating the show being broadcast at the time the public end-user records the feedback, information identifying the public end-user, a length of the feedback, the type of the feedback, or the like can be added to a file containing the public end-user's feedback.

In at least one embodiment, in response to the public end-user initiating recording of first user-generated media recording 107, first public user interface 107 pauses presentation of the media program. In some such embodiments, the media program can be muted and temporarily stored in a buffer, until the public end-user is done generating the user-generated media recording 103. When the recording is completed, playout of the media program can be resumed from the point at which it was muted. Various time-stretching or other suitable techniques can be used to allow the user to catch-up to the live broadcast. In streaming and podcasting embodiments, such a catch-up process would not be needed. In some embodiments, playout controls can be presented to the user, allowing the public end-user to fast forward through portions of the media show.

Once recording of the feedback is complete, first public end-user device 80 transmits the feedback, which is included in the user-generated media recording, and the metadata to talkback API 26, which stores the feedback in object storage 127, and the metadata in object storage 127. Information linking the metadata to the user-generated media recording 103 is also stored in database 129. In conjunction with storing the user-generated media recording and associated metadata, Talkback API 26 transmits a processing message to message queue service 123, notifying media converter 125 that a new user-generated media recording has been stored in Object storage 127.

Media converter 125 obtains the processing message from message from message queue service 123 and determines whether the newly stored user-generated media recording requires further processing. In some embodiments, all newly stored raw user-generated media recordings are automatically retrieved and processed. The processing performed by media converter 125 can include compressing the raw user-generated media recording, reformatting the raw user-generated media recording, stripping extraneous information from the raw user-generated media recording, or the like. After processing the raw user-generated media recording, media converter 125 stores a modified version of the user-generated media recording in object storage 127, and updates database 129 with the location of the modified version of the user-generated media recording within object storage 127. In various embodiments, media converter 125 notifies talkback API 26 when an updated version of the user-generated media recording has been stored in object storage 127 and is ready for delivery to private-user interface 111.

In other embodiments, not specifically illustrated in FIG. 2, talkback media automation services/applications 120 can include services or applications that monitor for abuse of recorded-media feedback system by public end-users, spam bots, or others. For example, in embodiments where media converter 125 or some other service provides audio transcription services, the content of text can be evaluated to automatically identify vulgar language. In some such cases, a user-generated media recording that includes vulgar language can be quarantined, deleted, or flagged for evaluation by a private end-user. Similarly, video content can be evaluated for vulgar actions, nudity, or the like, and be quarantined, deleted, or flagged depending on the severity of the visual content. Additionally, if a public end-user or device providing a user-generated media recording 103 has consistently used vulgar language or actions in previously submitted user-generated media recordings, the user can be prevented from generating and/or transmitting user-generated media recordings, for example by disabling a user selectable object within the public-user interface associated with the user. Optionally, media files received from known abusive public end-users or bots can be automatically deleted or discarded without performing an evaluation of the contents of the received message. If a particular device or user is blacklisted, or otherwise blocked from providing user-generated media recordings, the block can be removed after a desired period of time.

In some embodiments, the blocking period increases with additional violations. For example, if a user submits two vulgar messages within one month, the user can be blocked for one week. If, after the one-week block has been removed, the user submits an additional vulgar message, a six-month block can be applied. If the user submits another vulgar message after the six-month block has been removed, the user can be permanently banned from submitting user-generated media recordings.

The procedures for generating and processing user-generated media recordings, examples of which have been discussed above, can be repeated for other user-generated media recordings. Some of the other user-generated media recordings may be related to the same broadcast show, while others are related to different broadcast shows, streaming shows, podcasts, or the like. In each case, metadata and/or supplemental data associated with the user-generated media recordings are stored in database 129 and linked to the user-generated media recordings. The linked metadata and/or supplemental data can be used to identify a destination, device, show host, podcast creator, or the like to which the user-generated media recordings are to be delivered.

As noted above, recorded-media feedback system 98 also includes private end-user device 81, which is used to implement and display private-user interface 111. As will be discussed in greater detail with reference to the following figures, private-user interface 111 obtains and displays information related to user-generated media recordings stored in object storage 127. The information displayed by private-user interface 111 includes information associated with user-generated media recordings, which can include metadata and/or supplemental data retrieved from database 129, or derived information derived from the retrieved metadata and/or supplemental data. For example, in various embodiments the information associated with user-generated media recordings displayed using private-user interface 111 includes one or more of the following: usernames, media station names, media station call letters, media station frequencies, session identifiers, show names profile identifiers, tags associated with user-generated media recordings, a start date, an end date, one or more playout controls, one or more editing controls, one or more organizing controls, one or more user-generated media selection controls, and one or more other user selectable objects allowing a private end-user to screen, edit, schedule, playout, select, and otherwise manipulate particular user-generated media recordings. In at least one embodiment, private-user interface 111 and other portions of recorded-media feedback system 98 are integrated with media broadcast system 15 (FIG. 1) through talkback API 26 or master API 20 (FIG. 1). This integration allows recorded-media feedback system 98 to access broadcast, scheduling, editing, media storage, and other functionality provided by media broadcast system 15 in a manner that is transparent to private end-users working in private-user interface 111.

The various types of information associated with user-generated media recordings are further associated with a media show, media broadcast, broadcast media station, streaming media station, podcast, or the like that is being presented to a public end-user during the time the public end-user is recording the user-generated media recording. For example, if a public end-user is viewing a podcast on second public-user interface 109, the metadata associated with the second user-generated media recording 105 can include information identifying the podcast being viewed by the public end-user. That information can include timestamps indicating a time at which the recording started, a time at which the recording was completed, information identifying the podcast being viewed when the recording started/ended, a length of the recording, a host associated with the podcast being viewed when the recording started/ended, and the like. Similar information identifying streaming or broadcast stations, shows, podcasts, and/or content presented to the public end-user during the time the second user-generated media recording 105 is being recorded can also be included in the metadata associated with the second user-generated media recording 105.

In an operational example of private-user interface 111, a private-user can log into private end-user device 81 and/or an application that provides private-user interface 111 using a suitable authentication procedure. The verification procedure can include, but is not limited to, password authentication, token authentication, symmetric-key authentication, biometric authentication, single-factor authentication, multi-factor authentication, or the like. The private end-user can be a show host, show guest, show producer, podcast producer, podcast host, podcast guest, or some other private end-user to which a user-generated media recording may be directed. In various embodiments disclosed herein, user-generated media recordings stored in object storage 127 include public end-user feedback from multiple public end-users, with different user-generated media recordings being associated with different, hosts, stations, podcasts, shows, and the like. Metadata and any supplemental data associated with the user-generated media recordings is stored in database 129, and includes information establishing an association between particular user-generated media recordings and particular private end-users. In at least one embodiment, not all private end-users will have access to all stored user-generated media recordings and their associated metadata and/or supplemental data.

In some such embodiments, private end-users can be granted access to only those user-generated media recordings that are relevant to the private end-user by default. A user-generated media recording is, in at least one embodiment, considered relevant to a private end-user if both the private end-user and the user-generated media recording are both associated with the same media show, podcast, and/or station. In at least one embodiment, private-user interface 111 is automatically populated by default with information relevant to the private end-user that is using private-user interface 111. In some such cases, in response to receiving an indication that a first private-end user has logged in to private-user interface 111, talkback API 26 can query database 129 to determine which user-generated media recordings are relevant to the first private end-user, and instruct database 129 to transmit some or all of the metadata and supplemental data to private-user interface 111, without any private end-user interaction with private-user interface 111 beyond simply providing login credentials.

In other embodiments, talkback API 26 waits to receive selection input from private-user interface 111, before transmitting any metadata or supplemental data to the private-user interface 111. In some such embodiments, talkback API 26 can determine whether the information requested by the private end-user through private-user interface 111 is relevant to the private-end user. If the information requested is related to SHOW A, and the credentials provided by the requesting private end-user indicate that the private end-user is associated with SHOW A, then the requested information can be said to be relevant to the private end-user. Talkback API 26, having determined that the requested information is relevant to the requesting private end-user, can facilitate transmission of the requested information to private-user interface 111.

By way of contrast, assume that a private end-user submits a request for information related to SHOW B, if the private end-user is not associated with SHOW B, the requested information is determined to be irrelevant to the requesting private end-user, and thus will not be transmitted to private-user interface 111. The term "relevant" as used in this context refers to a decision about whether a requesting private end-user is authorized to access the information. Thus, in some embodiments a private end-user may be a station manager associated with a particular station, and may be granted access to all but one show being broadcast on that station. In that case, the one show to which the station manager is denied access is considered irrelevant to the station manager. Various criteria for determining relevance (access authorization) can include time limitations, station limitations, show limitations, session limitations, or the like.

In various embodiments, including some embodiments in which default information is displayed in private-user interface 111, a private end-user can include selections indicating which information is to be displayed on private-user interface 111. The selections available to the private end-user can include, but are not limited to, one or more stations, one or more shows or podcasts, time parameters, file tags, session parameters, public end-user parameters such as names, profile identifiers, submission histories, editing selections, file identifiers, insertion parameters, playout options, editing options, or the like. In addition, private end-users can sort, filter, edit, modify, schedule for current insertion, schedule for future insertion, respond to, or otherwise manipulate the information displayed in private-user interface 111 or the user-generated media recordings with which the information displayed in private-user interface 111 is associated.

Various embodiments of private-user interface 111 provide private end-users to insert a version of a user-generated media recording into a broadcast show currently being aired. For example, during broadcast of a media show, a public end-user records feedback related to the media show in second user-generated media recording 105 using second public-user interface 109. Within less than a minute after user-generated media recording 105 is finalized, it is sent to talkback API 26, which stores the raw user-generated media recording 105 and associated metadata in database 129. Talkback API 26 places a notification message in message queue service 123, which notifies media converter 125 that a new, raw user-generated media recording 105 has been stored in object storage 127. Media converter 125 modifies the new, raw user-generated media recording to properly format it for use by private-user interface 111, stores the modified version of the user-generated media recording in object storage 127, updates the metadata associated with the raw user-generated media recording 105 in database 129 to include a pointer to the modified version of the user-generated media recording, and notifies talkback API 26 that the modified version of the user-generated media recording is ready for distribution.

Assuming for purposes of this example that private end-user is already logged into private-user interface 111, talkback API sends a notification message to private-user interface 111. In some embodiments, information associated with the modified version of the user-generated media recording is automatically displayed on private-user interface 111. The private end-user can preview the modified version of the user-generated media recording by clicking on a "play" icon displayed on private-user interface 111. If the private end-users is satisfied that the modified version of the user-generated media recording can be broadcast as-is, the private end-user can select a "send for broadcast insertion" icon, which transmits a message to talkback API 26 indicating that the modified version of the user-generated media recording, which is stored in object storage 127, should be inserted into show currently being broadcast at the earliest opportunity. Talkback API 26 can notify media management system 45 that the modified version of the user-generated media recording is to be inserted into the show being currently broadcast, at the earliest opportunity, which will often be the next commercial break. Media management system 45 can perform its traffic and broadcast functions, to identify the next available insertion point, including bumping and rescheduling other items to make room for the modified version of the user-generated media recording.

In other embodiments, for example where the media show is a live broadcast and the private end-user is a talk show host, instead of sending the item to media management system 45 for insertion, the talk show host can insert the modified version of the user-generated media recording directly into the show by activating a playout icon.

Figure 3:
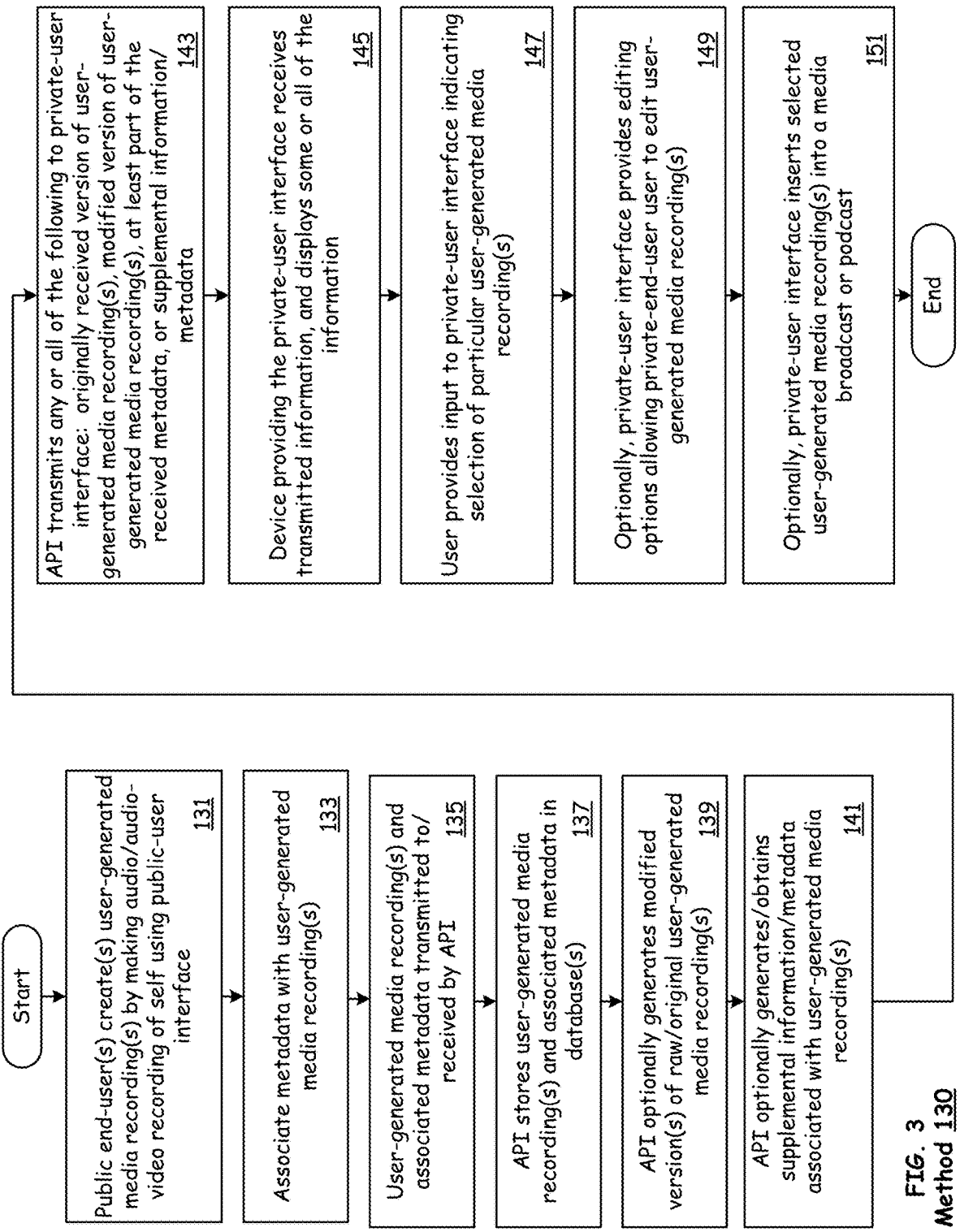
FIG. 3 is a flowchart illustrating a method of generating, transmitting, and receiving user-generated media recordings, and incorporating those user-generated media recordings into media shows, in accordance with embodiments of the present disclosure.

Referring next to FIG. 3, a method 130 of generating, transmitting, and receiving user-generated media recordings, and incorporating those user-generated media recordings into media shows, will be discussed in accordance with embodiments of the present disclosure.

As illustrated by block 131, one or more public end-users create one or more user-generated media recordings by making audio and/or audio-video recording of their own voice and/or image using a public-user interface. The user-generated media recording is, in at least one embodiment, created as a binary audio or video file. The public-user interface can be presented to a public end-user in response to the public end-user logging into a media service, a media playout device, a media playout application, or the like. In some embodiments, no login is required to gain access to the public end-user interface as a guest, but guest functionality may not provide access to all features. Additionally, in at least one embodiment, the public end-user interface integrates media playout and the ability to record public end-user feedback. In other embodiments, however, feedback recording and transmission functionality are provided by the public end-user interface, while playout functionality is provided by a separate media player or service.

As illustrated by block 133, public end-user interface records metadata and/or supplemental data associated with user-generated media recordings. The metadata and/or supplemental data is used to associate a public end-user with user-generated media recordings made by that public end-user, and to associate a media show being presented to the user with a user-generated media recording at the time the recording was made. The metadata and/or supplemental data can be collected from the end-user device used to implement the public-user interface, from information included in a media stream, from information included in a podcast, from information such as information embedded in a live broadcast, or the like. The media show, in turn, is used to associate a private end-user with the user-generated media recording. These different associations allow for delivery of the user-generated media recording to the proper private end-user and ensuring that the user-generated media recording was not made by a bot, among other things.

As illustrated by block 135, the user-generated media recordings and associated metadata are transmitted from the public-user interface and received by a talkback API, which stores the user-generated media recordings and their associated metadata in one or more databases, as illustrated by block 137.

As illustrated by block 139, the talkback API optionally generates modified version of the raw/original user-generated media recordings by issuing calls and/or instructions to one or more media automation services or applications.

As illustrated by block 141, the API can optionally generate or otherwise obtain supplemental information/metadata associated with the user generated media recordings. In various embodiments, some of the supplemental information is provided by the public-user interface, but the talkback API can obtain additional supplemental information from one or more talkback media automation services/applications, or from a media management system. In cases where the talkback API obtains the information from a media management system, the talkback API can send a query to a master API with identifying information, for example a user identifier, a device identifier, an Internet Protocol address, or the like. The master API can use the identifying information to query one or microservices that maintain user access/registration information to obtain the supplemental information, then return the supplemental information to the talkback API for storage in the one or more databases.

As illustrated by block 143, the talkback API transmits any or all of the following information to a private-user interface, either automatically, or in response to a request or query from the private end-user interface: originally received (i.e., raw) versions of user-generated media recordings; modified versions of user-generated media recording; and at least part of the metadata or supplemental information stored in the one or more databases, regardless of the source from which the metadata or supplemental information was received.

As illustrated by block 145, the device implementing the private-user interface receives and displays some, or all, of the information received from the talkback API. As illustrated by block 147, the private end-user interacts with the private-user interface to provide selection input selecting one or more particular user-generated media recordings. The selection input can indicate not only particular user-generated media recordings, but also an action to be taken with respect to the selected user-generated media recordings.

As illustrated by block 149, the private-user interface can optionally display editing options, including options to cut and trim the user-generated media recordings, filter the user-generated media recordings, normalize volume, generate fades, display mixing tools, insert "bleeps" or visual distortion filters, or the like.

As illustrated by block 151, in various embodiments, the private-user interface can optionally include media insertion and/or scheduling controls that allow the private end-users to insert an original or modified version of a user-generated media recording into a currently airing media show, or to schedule insertion of an original or modified version of a user-generated media recording into a future show. In at least one embodiment, a user-generated media recording can be inserted into the same instance of show that was being presented to the public end-user at the time the user-generated media recording was generated.

Figure 4:
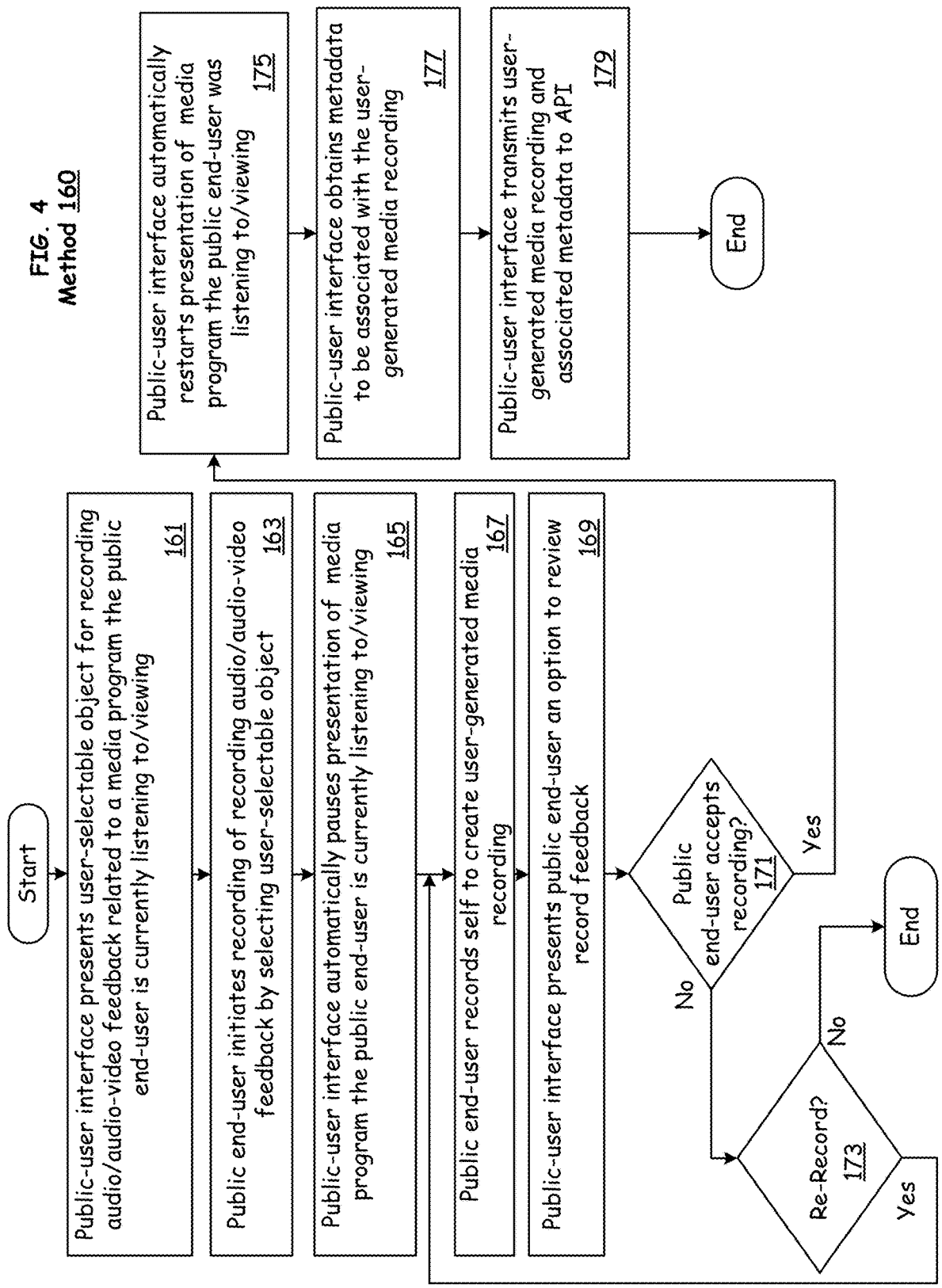
FIG. 4 is a flowchart illustrating a method implemented by a public-user interface in accordance with embodiments of the present disclosure.

Referring next to FIG. 4, a method 160 implemented by a public end-user interface will be discussed in accordance with embodiments of the present disclosure. As illustrated by block 161, a public end-user interface displays a user-selectable object, which upon activation initiates recording of audio/audio-video feedback related to a media program a public end-user is currently listening to or viewing. As illustrated by block 163 the public-user interface receives user input from the public end-user based on the user's activation of the user-selectable object.

As illustrated by block 165, in response to receiving the user input activating the user-selectable object, the public-user interface pauses presentation of the media program the public end-user is currently viewing or listening to, and activates a microphone, a camera, or both depending on the type of feedback the public end-user wants to record. In various embodiments, a countdown timer is displayed on the public-user interface to notify public end-users that a recording is about to start.

Optionally, the public end-user can be prompted to introduce themselves by name when recording a user-generated media recording. In most embodiments, there is no requirement for a public end-user to identify themselves verbally or visually while recording their feedback in the user-generated media recording. In some embodiments, registered users can be identified on the backend by their user ID, which may be associated with their email address and/or a general location. In some embodiments, the feedback can be associated with a full name and cell phone number, for example if the public end-user has a business or customer relationship with iHeartMedia.

As illustrated by block 167, the public end-user speaks or acts out feedback, and records the words spoken and/or the user's image while speaking or acting out the feedback. The recorded words and/or actions constitute a user-generated media recording, which may also be referred to herein as a user-generated media file. The length of the recording is limited to a maximum length of time, or in some cases a maximum file size. In at least one embodiment, the duration of the user-generated media file is limited to 30 seconds, although different durations can be implemented. For example, different maximum durations can be implemented based on whether the recording is an audio recording or an audio/video recording. In some embodiments, there is no minimum or maximum duration limit for feedback recordings.

As illustrated by block 169, upon completing the recording, the public-user interface can present the public-user with an option to review the recording. As illustrated by block 171, if the user is satisfied with the recording, and accepts it, method 160 proceeds to block 175. If a user determines that the recording is unacceptable to them, an option to re-record the feedback is presented at block 173. If, at block 173, the public end-user decides to re-record the feedback, method 160 returns to block 167. Otherwise, method 160 ends.

As illustrated by block 175, if the user-generated media recording is accepted by the public end-user, the public-user interface automatically restarts presentation of the paused media program.

As illustrated by block 177, once the media program is restarted, the public-user interface gathers metadata, and associates it with the user-generated media recording, and transmits the recording and the metadata to the talkback API for storage, processing, and later delivery to the relevant private end-user, as illustrated by block 179.

Figure 5:
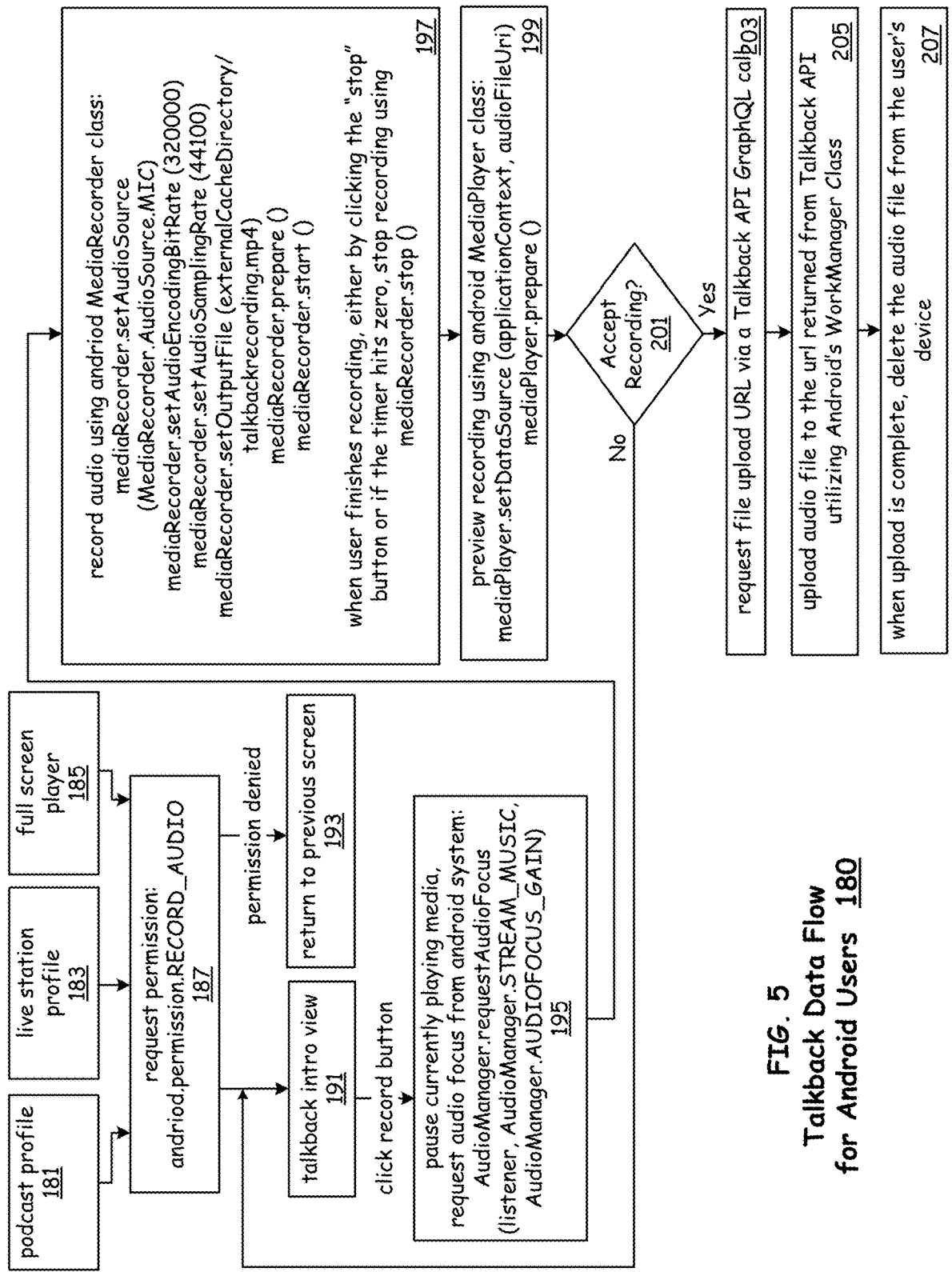
FIG. 5 is a flow chart illustrating a method of creating and uploading a user-generated media recording using a mobile device running an Android® operating system, in accordance with embodiments of the present disclosure.

Referring next to FIG. 5, a method 180 of creating and uploading a user-generated media recording using a mobile device running an Android® operating system will be discussed in accordance with embodiments of the present disclosure. Method 180 begins at the point a public end-user has requested, through a public-user interface, to provide feedback in the form of a user-generated media recording. Although audio feedback is described, similar techniques can be used with respect to video and audio-video feedback. As illustrated by block 181, the public-user interface obtains a podcast profile 181, a live station profile 183, and information from full screen media player 185. A non-full screen media player (not illustrated) can also be used in various embodiments.

As illustrated by block 187, a request is sent from the public-user interface to the Android® device requesting permission to access a microphone accessible to the Android® device, so that the microphone can be used to make an audio recording of the public end-user providing feedback related to a media show being presented in full screen media player 185. As illustrated by block 193, if the Android® device denies permission, method 180 returns to the previous screen, which in this example is the full screen media player 185.

As illustrated by block 191, if the request to access the device's microphone is granted, the public-user interface displays a "talkback intro" view on the Android® devices screen. The talkback intro view can be in the form of a graphical user interface (GUI) screen that is part of the public-user interface. The GUI screen can include instructions and user selectable objects. In at least one embodiment, the talkback intro view includes a user selectable record button that the public end-user can activate to initiate recording of a user-generated media recording that includes feedback related to a show currently being presented to the public end-user. The talkback intro view can also include one or more user selectable objects including, but not limited to, a stop object, a preview object, an accept/reject object, a return to playout object, or the like.

As illustrated by block 195, in response to determining that the public end-user has activated the record button, the public-user interface pauses the media being currently played out on the full screen media player 185 and request the Android® device to change the audio focus from the currently playing media to the microphone by using the built-in audio focus functionality provided by the Android® device. Audio focus forces audio playback from one to fade out in response to a request from another application. In some implementations, the currently playing media item can be fully or partially muted without being paused.

As illustrated by block 197, the public-user interface used the Android® MediaRecorder class to create a user-generated media recording. Recording of the public end-user stops in response to the public-user activating user selectable stop object, or upon expiration of a recording timer. In response to either of these two events, a media recorder stop function.

As illustrated by block 199, the Android® MediaPlayer class can be used to initiate a preview of the user-generated media recording. The MediaPlayer class can be invoked automatically upon termination of recording, without any additional user input, or in response to activation of a user selectable preview object.

As illustrated by block 201, the public end-user is presented with an option to accept or reject the user-generated media recording that was previewed. If the public end-user rejects the previewed recording, method 180 returns to the talkback intro view discussed with reference to block 191, where the public end-user can be presented with an option to re-record the user-generated media recording by selecting the user selectable record button, or to return to the full screen media player 185 by activating the user selectable return to playout object.

As illustrated by block 203, if the public end-user accepts the previewed recording, a request to upload the user-generated media recording can be automatically generated, without further user action. The upload request can be submitted via a GraphQL call to talkback API 26 (FIG. 2).

As illustrated by block 205, talkback API 26 responds to the upload request by providing a destination address, e.g., a Uniform Resource Locator, utilizing the WorkManager built into the Android® devices operating system. WorkManager is a background processing library that can be used to execute background tasks to be run in a guaranteed way, but not necessarily immediately. WorkManager can be used allow background processing to continue even when an application is not currently executing or if the device is rebooted.

As illustrated by block 207, once the user-generated media file has been uploaded to the address provided by talkback API 26, the media file can be deleted from the device.

Figure 6:
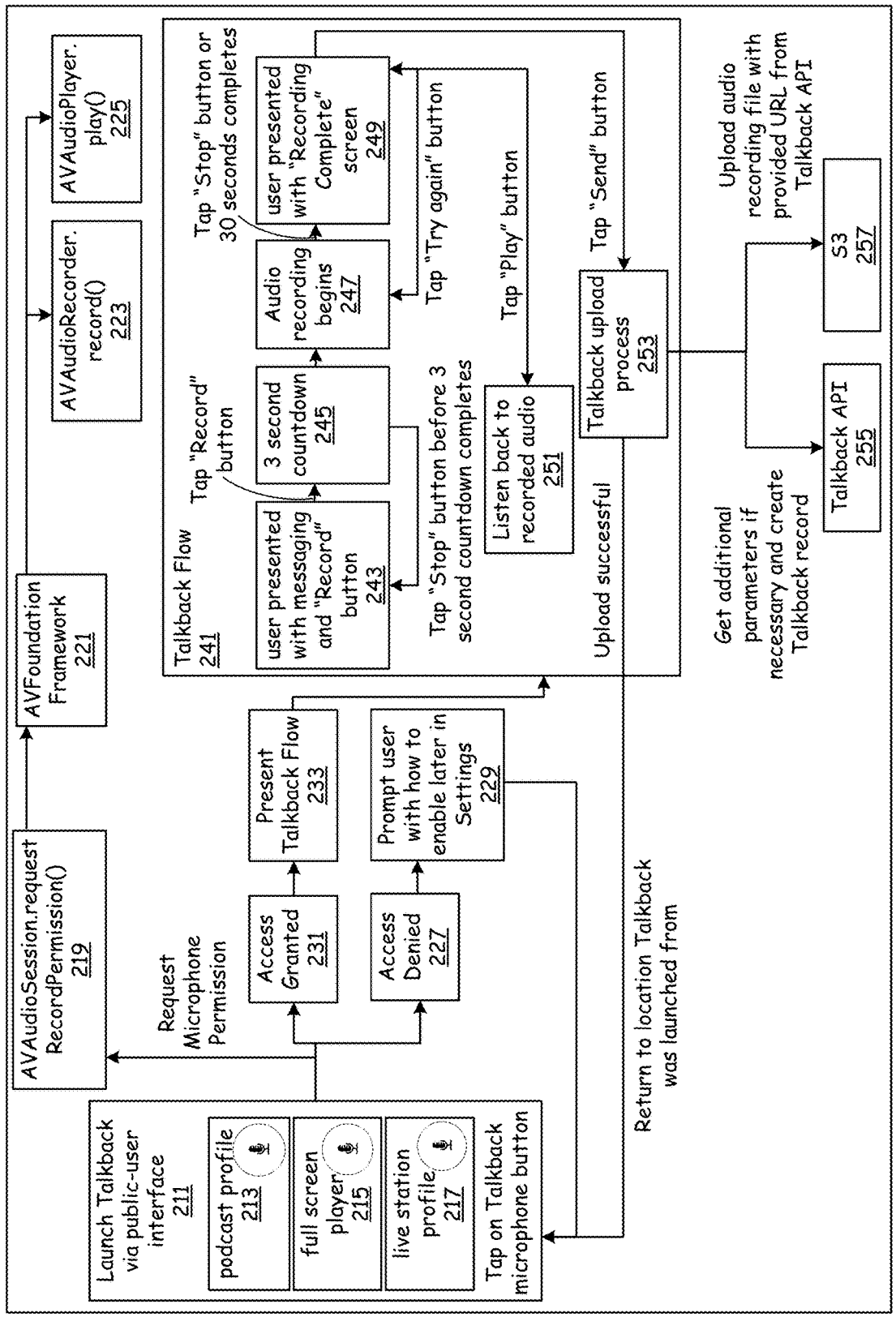
FIG. 6 is a flow chart illustrating a method of creating and uploading a user-generated media recording using a mobile device running an iOS® operating system, in accordance with embodiments of the present disclosure.

Referring next to FIG. 6, a method 210 of creating and uploading a user-generated media recording using a mobile device running an iOS® operating system will be discussed in accordance with embodiments of the present disclosure.

As illustrated by block 211, a media show is being presented to a public end-user on a public-user interface. The public-user interface 211 may be used by the public end-user to display any or all of a podcast profile 213, a full screen media player 215, or a live station profile 217. Podcast profile 213 can be displayed when a public-end user is listening to or viewing a podcast. Full screen media player 215 can be displayed when a public end-user is listening to or viewing a podcast, a streaming media station, or a live broadcast. Live station profile 217 can be displayed when the public end-user is listening to or viewing a live media station. Podcast profile 213, full screen media player 215, and live station profile 217 each include a user selectable object, illustrated in FIG. 3 as a microphone icon, configured to initiate a recording process upon activation. In some embodiments, Podcast profile 213, full screen media player 215, and live station profile 217 can also include one or more user selectable objects including, but not limited to, a stop object, a preview object, an accept/reject object, a return to playout object, or the like.

As illustrated by block 219, a request is sent from the public-user interface to the iOS® AV foundation Framework 221 requesting permission to access a microphone accessible to the iOS® device, so that the microphone can be used to make an audio recording of the public end-user providing feedback related to a media show being currently viewed or listened-to by the public end-user.

As illustrated by block 221, AVFoundation framework 221 interacts with AVAudioRecorder 223 and AVAudio Player 225 to ensure that the public end-user has granted permissions to use those assets. Although an audio process is illustrated, similar techniques can be used to with video and audio-video implementations.

As illustrated by block 227 if permission to access the microphone to record a user-generated media item is denied, the user can be prompted to enable the appropriate setting, as illustrated by block 229, and method 210 can return to the previously displayed screen or profile.

As illustrated by block 231, if permission to access the microphone to record a user-generated media item is granted, a talkback flow can be initiated as illustrated by block 233.

As illustrated by talkback flow block 241 the talkback flow can include presenting the public end-user with a user selectable record button, and/or a user selectable stop button, as illustrated by block 243. In some embodiments recording will automatically begin unless the stop button is pressed before a countdown time expires, as illustrated by 3 second countdown block 245. In other embodiments, recording will begin in response to the public end-user activating the record button.

As illustrated by block 247, audio recording begins, and continues either until a maximum recording duration is reached, in this example 30 seconds, or until the public end-user presses a stop button.

As illustrated by block 249, in response to termination of the recording, a "Recording complete screen" can be presented to the public end-user via the public-user interface. The recording complete screen can include a playout object, a "try again" object, a return to playout object, a send button, or the like. As illustrated by block 251, the public end-user can activate the playout object to listen or view the user-recorded media item. If the user wants to re-record the user-generated media file, the user can select the "try again" object, and the method will return to block 247. If the user wants to simply discard the recording without recording a replacement, method 210 can return to the profile or player screen that was displayed at the beginning of the process and the recording can be discarded. If the public end-user approves of the user-generated media recording, the user can select the "send" button to initiate a talkback upload process.

As illustrated by talkback upload process block 253 and talkback API block 255, the talkback upload process can communicate with the talkback API to obtain parameters, for example a destination address to which the user-generated media recording is to be transmitted. For example, the talkback API can provide the public-user interface with a uniform resource locator (URL) of an object storage database to which the user-generated media recording is to be transmitted for storage, as illustrated by S3 block 257. Additional address information can be provided indicating where metadata associated with the user-generated media recording is to be stored. In other embodiments, the metadata associated with the user-generated media recording and the user-generated media recording can be stored together, and the metadata can be extracted from the user-generated media recording and stored in a separate database.

Figure 7:
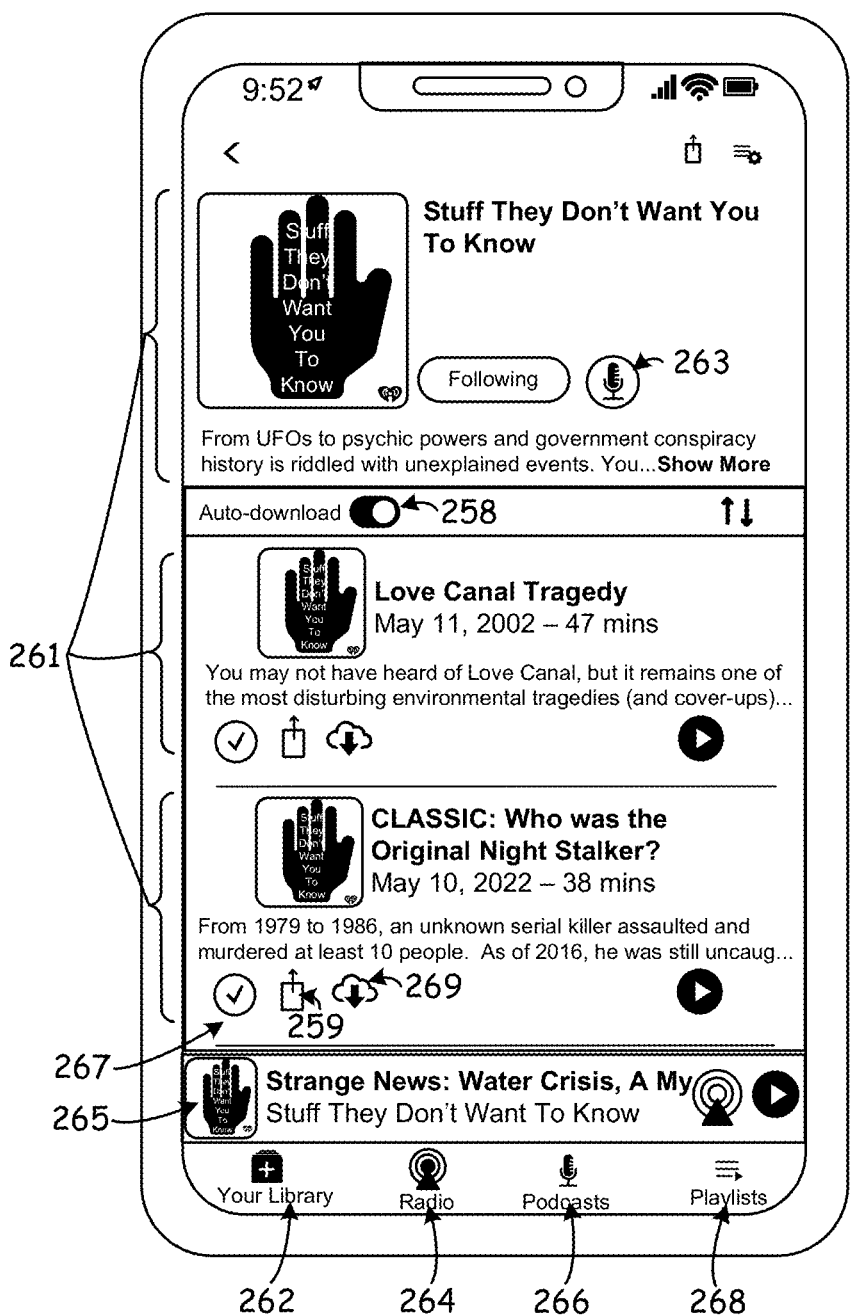
FIG. 7 is a schematic block diagram illustrating a podcast selection screen of a public-user interface in accordance with embodiments of the present disclosure.

Referring next to FIG. 7, a podcast selection screen 260 of a public-user interface will be discussed in accordance with embodiments of the present disclosure. Podcast selection screen 260 can be employed by a public end-user to select podcasts for listening or viewing. The podcast selection screen 260 can include one or more podcast display areas 261, which display information and options related to podcasts suggested for the public end-user based on a search performed by the public end-user, browsing history, subscription preferences, or the like. The options displayed in podcast display areas 261 can include, but are not limited to, automatic download option 258, download from cloud storage option 269, upload option 259, and selection option 267.

Podcast selection screen 260 can also include a current podcast area 265, which displays information and options for a podcast being currently viewed. Controls within current podcast area 265 can include controls that allow sending the podcast to another display device, play/pause controls, etc.

Podcast selection screen 260 can also display one or more media selection options, such as library object 262, which initiates display of a library screen for selection and playout of media items from a library; a radio object 264, which initiates display of a radio screen for selection and playout of a radio station; a podcast object 266, which initiates display of the podcast selection screen 260, and a playlist object 268, which initiates display of a playlist screen for creation, selection and playout of playlists. Each of the different screens mentioned above can be presented in a similar manner to podcast selection screen 260, but with controls appropriate to the type of media associated with the particular screen being displayed.

In the illustrated example, the public end-user is following the podcast entitled "Stuff They Don't Want You To Know," as shown in the topmost podcast display areas 261 of FIG. 7, and includes user selectable record object 263, which can be activated by the public end-user to initiate recording voice feedback associated with the "Stuff They Don't Want You To Know" podcast. The voice feedback is recorded in a user-generated media recording, which can be sent to the host of the podcast.

Figure 8:
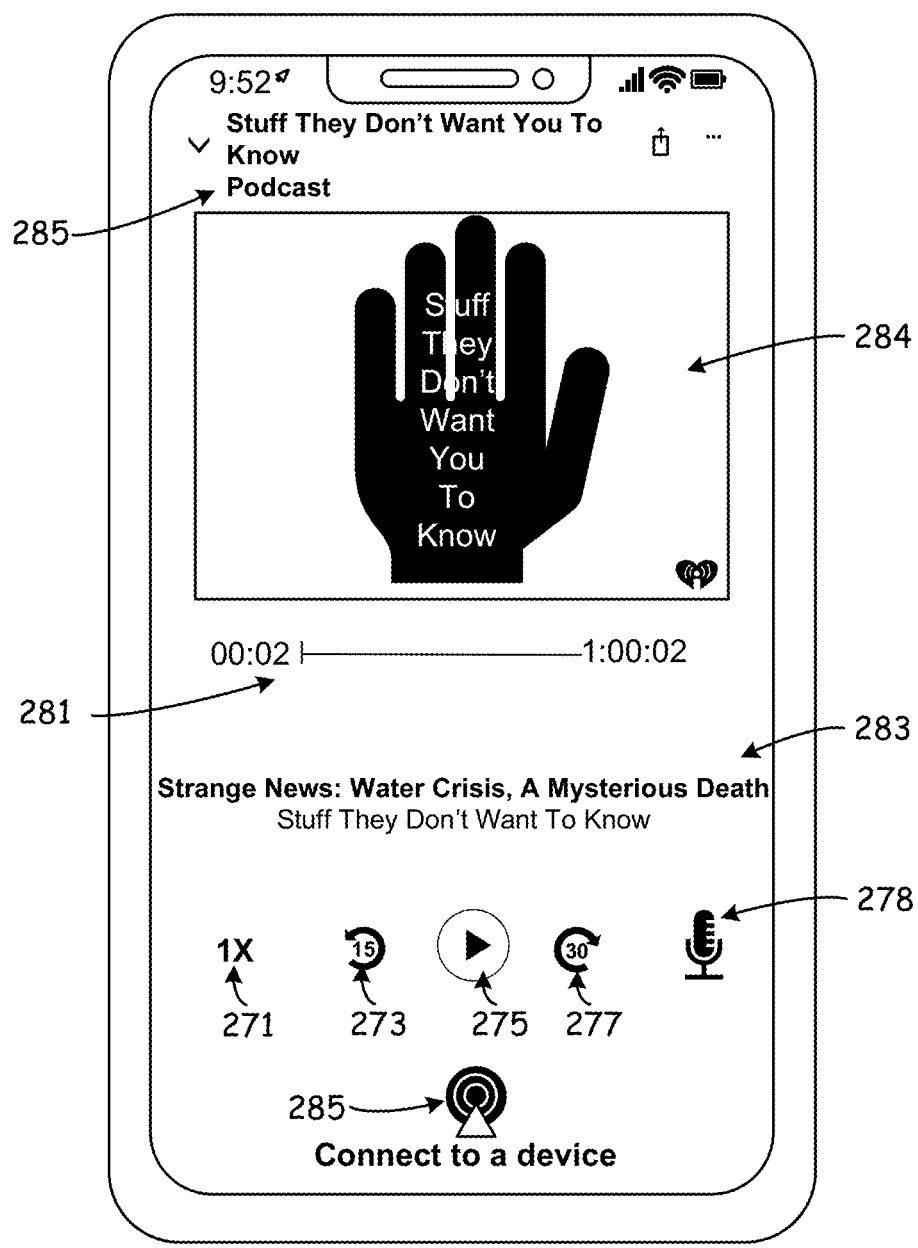
FIG. 8 is a schematic block diagram illustrating a podcast profile screen of a public-user interface in accordance with embodiments of the present disclosure.

Referring next to FIG. 8, a podcast profile screen 270 of a public-user interface will be discussed in accordance with embodiments of the present disclosure. In the illustrated embodiments, podcast profile screen 270 functions as a media playout screen displayed as part of a public-user interface. In some such embodiments, podcast profile screen 270 includes controls, such as speed selector 271, rewind control 273, play/pause control 275, fast forward control 277, and feedback record object 278, which functions to initiate generation of user-generated media recordings. Podcast profile screen 270 can also include video/image presentation area 284, progress indicator 281, episode/show information area 283, and title area 285.

Figure 9:
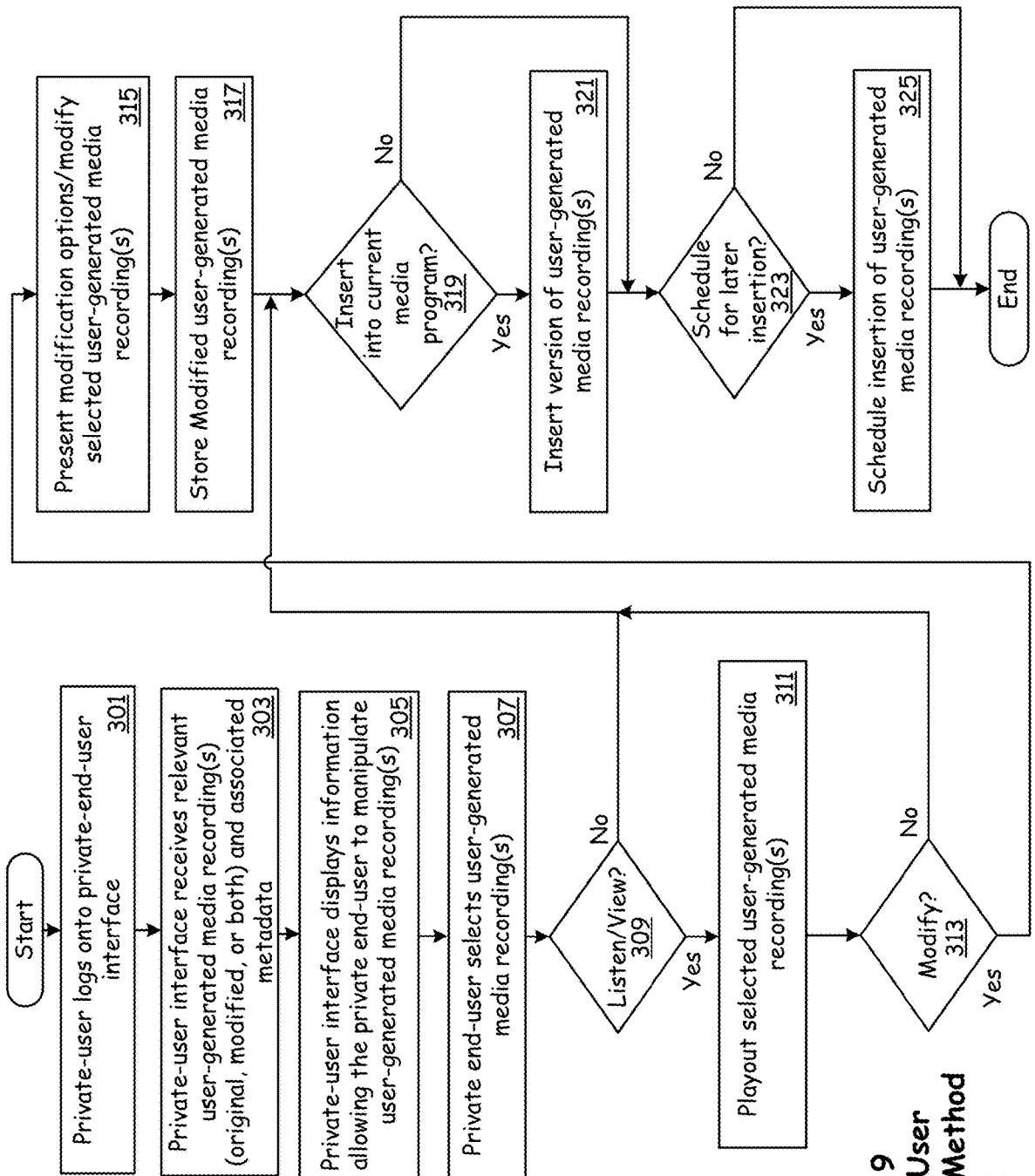
FIG. 9 is a flowchart illustrating a method implemented by a private-user interface in accordance with embodiments of the present disclosure.

Referring next to FIG. 9 a method 300 implemented by a private-user interface will be discussed in accordance with embodiments of the present disclosure.

As illustrated by block 301, a private-user logs onto a private-user interface, such as private-user interface 111 (FIG. 2).

As illustrated by block 303, the private-user interface receives relevant user-generated media recordings from talkback API 26 (FIG. 2). In various embodiments, the private-user interface receives either original versions of user-generated media recordings, modified versions of user-generated media recordings, or both. In some embodiments, metadata or other information associated with the user-generated media recordings is received and displayed by the private-user interface, and only after the private end-user selects particular user-generated media recordings are those recordings transmitted to the private-user interface.

As illustrated by block 305, in various embodiments, relevant metadata is automatically populated by default in the private-user interface based on indirect associations between the private end-user and the user generated media recordings via a media show, media podcast or media station. In other words, a user generated media recording can be considered relevant to a private end-user if both the user generated media recording and the private end-user are associated with a particular media show, podcast, or station. In other embodiments, relevance is determined based on a location in which a user-generated media recording and/or associated metadata is stored. In this way, private-user interface need only request information stored at a location associated with a private end-user currently using the private-user interface. In some embodiments, information about relevant user-generated media recordings is populated in response to selection criteria input by a private end-user via the private-user interface.

In any case, the private-user interface displays information and controls that allow the private end-user to manipulate both the displayed data, and the user-generated media recordings with which the displayed data is associated. Manipulation can include sorting, modifying, deleting, scheduling a particular version of a user-generated media recording for insertion into a show, broadcast, podcast, etc., or inserting a version of a user-generated media recording into a currently airing show, broadcast, or podcast. In some embodiments, the private end-user can use the private-user interface to selectively insert user-generated media recordings in shows airing in one market, or on one station, but not in shows airing in a different market or on a different station.

As illustrated by block 307, the private end-user selects one or more of the user-generated media recordings for listening/viewing, for modification, for current insertion, or for scheduled insertion. As illustrated by block 309, a check is made to determine whether the private end-user has selected a user-generated media recording for listening or viewing. If the result of the determination at block 309 indicates that the private end-user has selected the user-generated media recording for listening or viewing, method 300 proceeds to block 311, where the selected user-generated media recording is played out to the private end-user. If the result of the determination at block 309 indicates that the private end-user has selected the user-generated media recording for listening or viewing, method 300 proceeds to block 319.

As illustrated by block 313, after the user-generated media recording is played out at block 311, the private end-user is presented with an option to modify, or edit, the selected user-generated media recording, and a determination is made, based regarding whether the user-generated media recording is to be modified. If the result of the determination at block 313 indicates that the user-generated media recording is to be modified, method 300 proceeds to block 315. Otherwise, method 300 proceeds to block 319.

As illustrated by block 315, modification options are presented to the private end-user through the private-user interface. The modification options allow the private end-user to make any of various audio and/or video edits to the user-generated media recording. The modification options can include cropping, blurring, clipping, pitch correction, make volume changes, insert fades, splice, equalize, compress, introduce delays, or the like.

As illustrated by block 317, after modifying the user-generated media recording at block 315, a modified version of the user-generated media recording can be stored by the private-user interface. In some implementations, the modified version of the user-generated media recording can be transmitted to object storage 127 (FIG. 2) under control of talkback API 26, and metadata associated with the modifications can be stored in database 129. In some embodiments, the modified version of the user-generated media recording and any newly generated metadata can be stored locally, on private end-user device 81 (FIG. 2) on which the private user interface is being implemented.

As illustrated by block 319, a check is made to determine if either an unmodified or modified version of the user-generated media recording is to be inserted into a media show or program that is currently being presented to the public end-user. This determination can be made by comparing time stamps or other metadata associated the unmodified version of the user-generated media recording with a currently airing show or podcast to determine if the currently airing show or podcast is the same show or podcast that was being presented to the public end-user at the time the user-generated media recording was created. In some cases, a user-generated media recording can be inserted into a current media show or program even if a different episode of the show or program was airing at the time the user-generated media recording was created. Thus, if a public end-user recorded feedback related to a previously aired media show, the host of that media show may decide that the feedback included in the user-generated media recording is relevant to a discussion taking place in the currently airing media program, and so decide to insert the user-generated media recording into the current media program.

If the determination made at block 319 indicates that the user-generated media recording is to be inserted into a currently airing show or program, method 300 proceeds to block 321. As illustrated by block 321, a selected version of the user-generated media recording is inserted into the current media program. Insertion can be performed locally, or by transmitting an insertion request to the talkback API, which can make appropriate calls and requests for media management system 45 to handle the insertion.

If the determination made at block 319 indicates that the user-generated media recording is not to be inserted into a currently airing show or program, method 300 proceeds to block 323, where a check is made to determine if the user-generated media recording is to be scheduled for later insertion. If the determination at block 323 indicates that the user-generated media recording is to be scheduled for later insertion, method 300 proceeds to block 325, where insertions is scheduled. The request for insertion can be transmitted from the private-user interface to talkback API, which can in turn request media automation system, which includes traffic and scheduling functionality, to automatically choose an acceptable schedule slot in which to insert the user-generated media recording.

If the determination at block 323 indicates that the user-generated media recording is not to be scheduled for later insertion, method 300 ends.

Figure 10:
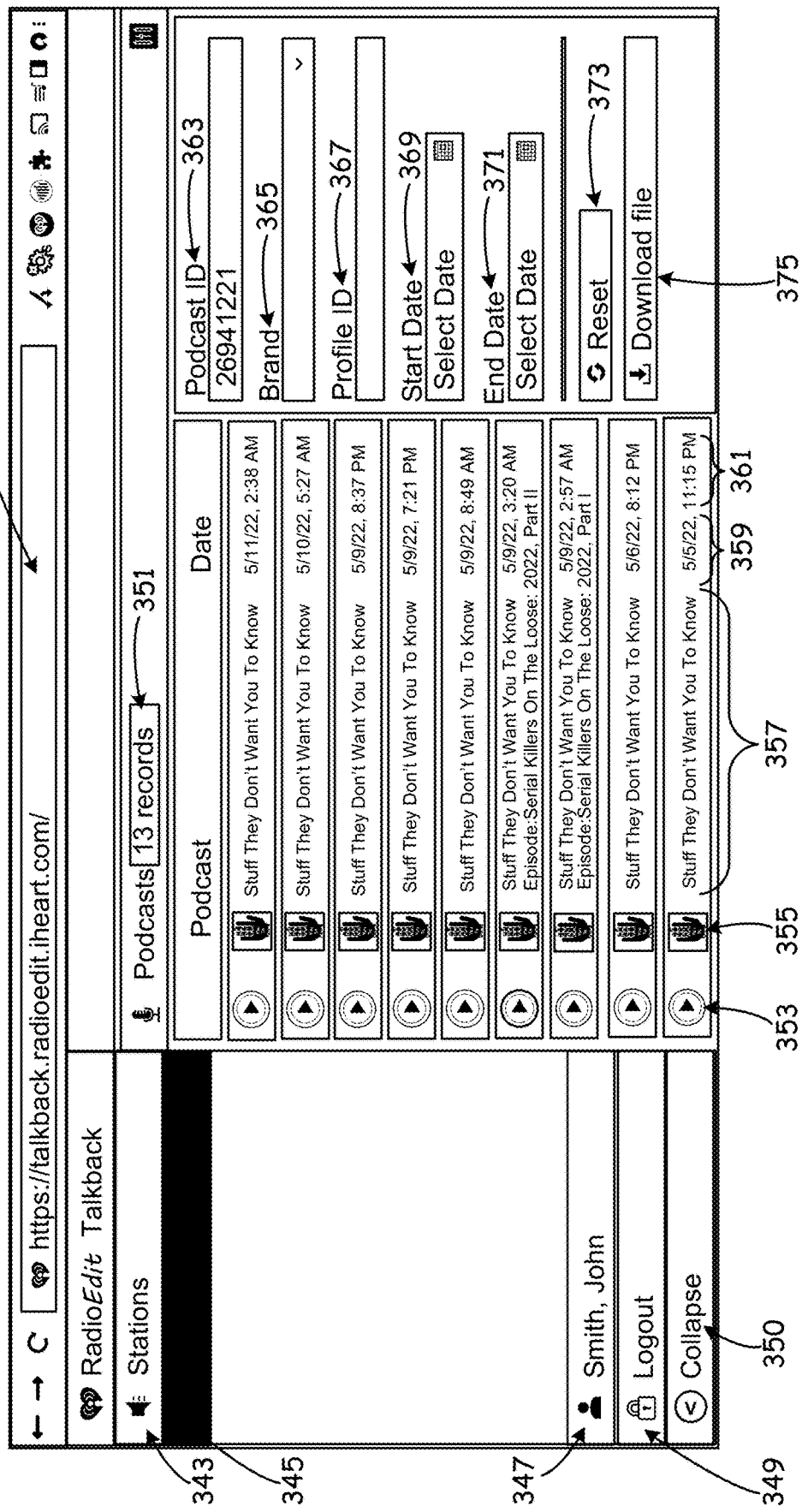
FIG. 10 is a schematic block diagram illustrating a feedback-selection screen of a private-user interface in accordance with embodiments of the present disclosure.

Referring next to FIG. 10, a feedback-selection screen 340 of a private-user interface will be discussed in accordance with embodiments of the present disclosure. Feedback-selection screen 340 includes address bar 341; counter 351 indicating a number of records that have been populated in the private user interface; one or more media-type selectors, which can include but are not limited to stations media selector 343 and podcast media selector 345; private end-user identifier 347, logout option 349, menu collapse control 350; and information associated with relevant user-generated media recordings, including name and episode information 357, recording date 359, time stamp 361, and media art 355. Feedback-selection screen 340 can also include various controls and search tools, including playout control 353, podcast identifier 363, brand field 365, profile identifier 367, start date selector 369, end date selector 371, reset control 373, and file download control 375.

The feedback selection screen 340 of FIG. 10 is illustrated with podcast media selector 345 having been selected. Thus, the headings and the information displayed in feedback selection screen 340 are specific to podcast. But similar information specific to media stations or other media types can be displayed, depending on which media type is selected. For example, a station identifier, rather than podcast identifier 363, can be displayed to indicate that the information being displayed on feedback selection screen 340 is related to a particular media station. Similarly, if a "show" media-type selector is used (not illustrated) a show identifier can be substituted for podcast identifier 363. Thus, although the following discussion focuses on podcasts, feedback selection screen 340 can be implemented for use with media types other than podcasts.

In an example of operation, a private end-user can select the podcast media type by choosing podcast media selector 345 from the feedback screen 340 of a private-user interface. The search tools, allow the private end-user to provide selection criteria that can be used by talkback API to select relevant user-generated media recordings, and provide information about those relevant user-generated media recordings to the private-user interface. For example, a private end-user can use podcast identifier 363, start date selector 369, and end date selector 371 to specify that information about user-generated media recordings that are both associated with a particular podcast, and were created during a specific date range should be displayed. Brand field 365 can be used to add a brand criterion, so that only information about user-generated media recordings matching the brand criterion will be displayed.

In various embodiments, a host or other private end-user can be associated with a profile, and that profile can be assigned an identifier. If more than one host is associated with a particular podcast, the profile ID can allow the private end-user identified by private end-user identifier 347 to select one of the hosts based on the hosts' profiles To help the private end-user quickly review the user-generated media recordings, the playout controls 353 located next to each record can be used to playout the associated of user-generated media recordings. Other controls, although not specifically illustrated, can be displayed for use in quickly sorting, deleting, selecting, or otherwise interacting with a particular user-generated media recording. In various embodiments, standard highlight/delete/copy/paste and other functions can be used to allow the private end-user to interact with listed user-generated media recordings including podcast feedback. In some embodiments, clicking on a particular record can open a feedback information screen, which will be discussed with respect to FIG. 11.

Figure 11:
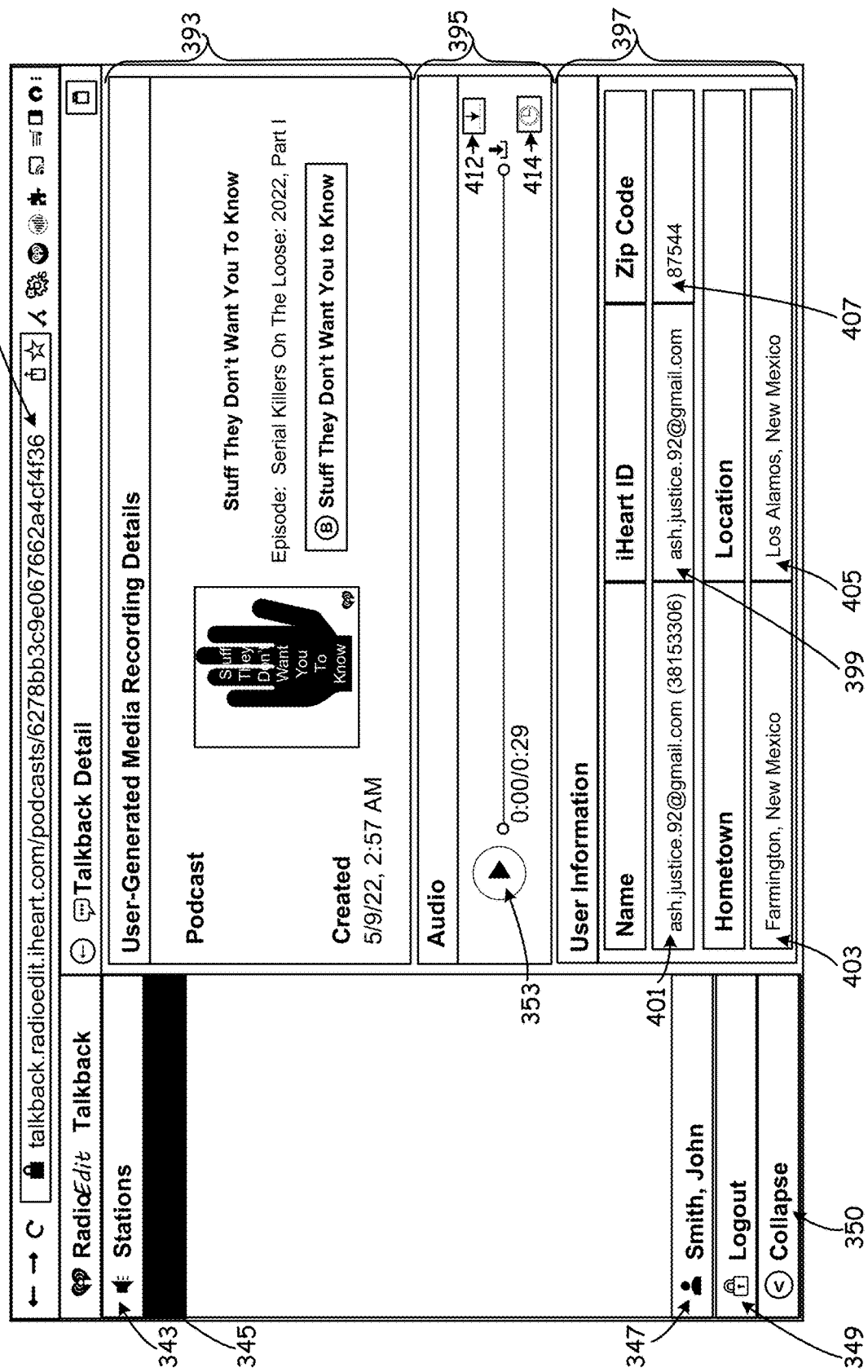
FIG. 11 is a schematic block diagram illustrating a feedback information screen of a private-user interface in accordance with embodiments of the present disclosure.

Referring next to FIG. 11, a feedback information screen 390 of a private-user interface will be discussed in accordance with embodiments of the present disclosure. Feedback information screen 390 includes address bar 341; one or more media-type selectors, which can include but are not limited to stations media selector 343 and podcast media selector 345; private end-user identifier 347, logout option 349, menu collapse control 350; and information and controls associated with a selected user-generated media recording. The information and controls associated with the selected user-generated media recording can be organized into three or more general portions: user-generated media recording details 393; audio (or video) playback control area 395; and user information area 397.

User-generated media recording details 393 can include the date and time the user-generated media recording was created, the podcast title and episode with which the user-generated media recording is associated. Information for user-generated media recording associated with a particular station (not illustrated) can include a station name, a show name, a market name, or the like. The creation time and date can be the time at which the recording was initiated, the date and time at which the recording was completed, the date and time at which transmission of the recording from the public-user interface to a location specified by API 26 was started or completed, or some other suitable time-stamp information.

Audio (or video) playback control area 395 can display a progress indicator and a play/pause control 353, along with other suitable playout controls. In at least one embodiment, an insert object 412 and a schedule object 414 can be displayed in playback control area 395. Insert object 412 can be activated to initiate insertion of the user-generated media recording into a currently airing show, and schedule object 414 can be used to initiate scheduling of the user-generated media recording for broadcast or delivery at some future time.

User information area 397 can display a username 401 associated with a public end-user who created the user-generated media recording, a media service identifier 399 associated with the public end-user, a zip code 407 associated with the public end-user; a location 405 indicating a location where the public end-user created the user-generated media recording, and a hometown 403 associated with the public end-user.

Referring now to FIG. 12, a high-level block diagram of a processing system is illustrated and discussed. Methods and processes and other embodiments discussed previously may be implemented in a processing system executing a set of instructions stored in memory, or on a removable computer readable medium. An example of a processing system according to some embodiments is illustrated in FIG. 12. Computing system 500 includes one or more central processing units, such as CPU A 505 and CPU B 507, which may be conventional microprocessors interconnected with various other units via at least one system bus 508. CPU A 505 and CPU B 507 may be separate cores of an individual, multi-core processor, or individual processors connected via a specialized bus 506. In some embodiments, CPU A 505 or CPU B 507 may be a specialized processor, such as a graphics processor, other co-processor, or the like.

Computing system 500 includes random access memory (RAM) 520; read-only memory (ROM) 515, wherein the ROM 515 could also be erasable programmable read-only memory (EPROM) or electrically erasable programmable read-only memory (EEPROM); and input/output (I/O) adapter 525, for connecting peripheral devices such as disk units 530, optical drive 536, or tape drive 537 to system bus 508; a user interface adapter 540 for connecting keyboard 545, mouse 550, speaker 555, microphone 560, or other user interface devices to system bus 508; communications adapter 565 for connecting processing system 500 to an information network such as the Internet or any of various local area networks, wide area networks, telephone networks, or the like; and display adapter 570 for connecting system bus 508 to a display device such as monitor 575. Mouse 550 has a series of buttons 580, 585 and may be used to control a cursor shown on monitor 575.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As used herein, the term "primary content" refers to non-advertisement programming, shows, entertainment content, news, traffic, weather, music, or the like. The term "advertising content" refers to advertisements inserted into designated spots within a media broadcast schedule. "Tertiary content" refers to content such as filler material, station identifiers, liners or other content generated by on-air personalities, and the like. In at least one embodiment, user-generated media recordings are considered "tertiary content."

As used herein, the term "log," or "broadcast log" refers to an ordered broadcast schedule that includes information identifying particular items to be broadcast or streamed at particular times. A log normally includes time slots for insertion of primary content, time slots for insertion of advertising content, and time slots for insertion of certain tertiary content; although the tertiary content is sometimes inserted into slots designated for primary or advertising content. The information in the log that identifies particular items can include titles, addresses from which the items can be obtained, or the like. Although a log can be said to include the media items to be broadcast, logs usually include information identifying the content or a location from which the content can be obtained.

A log is generally created from a "clock," which can include time slots and content type identifiers. Once particular items are designated to fill particular time slots, the clock with populated time slots is referred to as a log. Note that in some cases, the term "log" is also used herein to refer to a record of something that has happened. The meaning of the term "log" will be apparent by its context, and if not, the specific meaning will be indicated.

The term "spot" may sometimes be used herein to refer to advertisements themselves, and at other times used to refer to a time slot in a log that is reserved for an advertisement. Thus, a spot (a position in a log) can be filled by a spot (an advertisement). The meaning of the term "spot" will be apparent by its context, and if not, the specific meaning will be indicated As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal X>5 is equivalent to determining if −X<−5, and the comparison to determine if signal A matches signal B can likewise be performed by determining −A matches −B or not (A) matches not (B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data in a non-transitory medium includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprising:
receiving from a first device, at a processing system including at least one processor and associated memory:
  a user-generated media recording recorded by a media consumer through a public-user interface presented on the first device, wherein the user-generated media recording is a recording of the media consumer captured on the first device during a media broadcast; and
  first metadata including information linking the user-generated media recording to the media broadcast;
storing the user-generated media recording and the first metadata in one or more storage devices
associating supplemental metadata with the user-generated media recording, the supplemental metadata including information related to delivery of the user-generated media recording, and information identifying a pre-recorded media show being consumed by the media consumer at a time the user-generated media recording was created; and
transmitting, based at least in part on the supplemental metadata, a version of the user-generated media recording and at least a portion of the first metadata and the supplemental metadata to a private-user interface on a second device, wherein the private-user interface is configured to receive input from a host of the media broadcast indicating selection of the version of the user-generated media recording for broadcast during the media broadcast.

2. The method of claim 1, further comprising:
wherein the supplemental metadata includes information related to the media consumer; and
transmitting at least a portion of the supplemental metadata to the private-user interface in conjunction with the at least a portion of the first metadata.

3. The method of claim 1, further comprising:
generating a modified version of the user-generated media recording at the processing system; and
wherein transmitting the version of the user-generated media recording includes transmitting the modified version of the user-generated media recording.

4. The method of claim 1, wherein:
the user-generated media recording includes a raw media file.

5. The method of claim 4, further comprising:
transmitting a notification message to a transcoding service, wherein the notification message instructs that transcoding service to obtain the raw media file from the one or more storage devices, generate a transcoded version of the raw media file, and store the transcoded version of the raw media file in the one or more storage devices.

6. The method of claim 1, further comprising:
receiving from a plurality of first devices, at the processing system:
  a plurality of user-generated media recordings recorded by a plurality of media consumers through a plurality of public-user interfaces presented on the plurality of first devices, wherein each of the plurality of user-generated media recordings is a recording of one of the plurality of media consumers recorded on one of the plurality of first devices during one or more media broadcasts; and
  a plurality of first metadata collections including information linking the plurality of user-generated media recording to the one or more media broadcasts;
storing the user-generated media recordings and the plurality of first metadata collections in one or more storage devices; and
transmitting each of the plurality of user-generated media recordings and at least a portion of each first metadata collection of the plurality of first metadata collections to the private-user interface, wherein the private-user interface is further configured to receive second input from a host of the media broadcast selecting a particular user-generated media recording of the plurality of user-generated media recordings.

7. The method of claim 1, further comprising:
receiving, at the processing system, a selection message from the private-user interface, wherein the selection message includes information indicating that the host of the media broadcast has selected the version of the user-generated media recording for broadcast during the media broadcast; and
in response to receiving the selection message, transmitting an insertion message to a media broadcast system, wherein the insertion message instructs the media broadcast system to insert the version of the user-generated media recording into the media broadcast.

8. A recorded-media feedback system comprising:
an application programming interface (API) running on at least one processing device, the API configured to:
  receive from a first device, at a processing system including at least one processor and associated memory:
    a user-generated media recording recorded by a media consumer through a public-user interface presented on the first device, wherein the user-generated media recording is a recording of the media consumer captured on the first device during a media broadcast; and
    first metadata including information associated with the user-generated media recording;
  store the user-generated media recording and the first metadata in one or more storage devices;
  associate supplemental metadata with the user-generated media recording, the supplemental metadata including information related to delivery of the user-generated media recording, and information identifying a pre-recorded media show being consumed by the media consumer at a time the user-generated media recording was created; and
  transmit, based at least in part on the supplemental metadata, a version of the user-generated media recording, at least a portion of the first metadata, and the supplemental metadata to a private-user interface;
a second device including a processor and associated memory, the second device configured to implement the private-user interface, wherein the private-user interface is configured to:

receive input from a host of the media broadcast selecting the version of the user-generated media recording; and in response to receiving the input from the host of the media broadcast, display an option to insert the version of the user-generated media recording into the media broadcast.

9. The recorded-media feedback system of claim 8, wherein:
the private-user interface is further configured to transmit a polling message to the API; and
the API is further configured to transmit the version of the user-generated media recording and the at least a portion of the first metadata to the private-user interface in response to receiving the polling message.

10. The media feedback system of claim 8, wherein the API is further configured to:
maintain information indicating a current network address associated with the second device; and
push the version of the user-generated media recording and the at least a portion of the first metadata to the private-user interface.

11. The recorded-media feedback system of claim 8, wherein the API is further configured to:
receive a plurality of user-generated media recordings associated with a plurality of different media broadcasts, wherein each of the different media broadcasts is associated with a particular media consumer;
store first user-generated media recordings associated with a first media consumer in a first storage location; and
store second user-generated media recordings associated with a second media consumer in a second storage location.

12. The recorded-media feedback system of claim 8, wherein:
the API is further configured to:
compare the first metadata against a database of known brands;
transmit images associated with the media broadcast to the private-user interface; and
the private-user interface is further configured to display the images associated with the media broadcast in conjunction with at least a portion of the first metadata.

13. The recorded-media feedback system of claim 8, wherein the API is further configured to:
transmit a notification message to a transcoding service, wherein the notification message instructs that transcoding service to obtain the user-generated media recording from the one or more storage devices, generate a transcoded version of the user-generated media recording, and store the transcoded version of the user-generated media recording in the one or more storage devices.

14. The recorded-media feedback system of claim 8, wherein the API is further configured to:
receive a selection message from the private-user interface, wherein the selection message includes information indicating that the host of the media broadcast has selected the version of the user-generated media recording for broadcast during the media broadcast; and
in response to receiving the selection message, transmit an insertion message to a media broadcast system, wherein the insertion message instructs the media broadcast system to insert the version of the user-generated media recording into the media broadcast.

15. The recorded-media feedback system of claim 8, wherein:
the private-user interface is further configured to:
display editing options for the version of the user-generated media recording;
receive second input from the host of the media broadcast, wherein the second input indicates modifications to the version of the user-generated media recording;
the second device is further configured to:
generate an edited version of the user-generated media recording based on the second input; and
receive third input from a host of the media broadcast selecting the edited version of the user-generated media recording for broadcast during the media broadcast.

16. A recorded-media feedback system comprising:
a first processing device configured to execute an application program interface (API);
a second processing device configured to implement an object storage service;
a third processing device configured to implement a message queue service;
a fourth processing device configured to implement a database;
the API is configured to:
receive, from a public-user interface, a user-generated media recording including captured audio feedback generated by a media consumer during the media broadcast, and first metadata associated with the user-generated media recording;
store the user-generated media recording using the object storage service;
store the first metadata in the database;
create a notification message using the message queue service, wherein the notification message instructs a media-convert service to obtain the user-generated media recording from the object storage service, generate a converted version of the user-generated media recording, and store the converted version of the user-generated media recording using the object storage service;
associate supplemental metadata with the user-generated media recording, the supplemental metadata including information identifying a pre-recorded media show being consumed by the media consumer at a time the user-generated media recording was created; and
transmit the supplemental metadata to a private-user interface; and
transmit the converted version of the user-generated media recording, at least a portion of the first metadata, and the supplemental metadata to the private-user interface.

17. The recorded-media feedback system of claim 16, wherein the supplemental metadata includes:
information identifying a broadcast host associated with a radio broadcast being consumed by the media consumer at a time the user-generated media recording was created.

18. The recorded-media feedback system of claim 16, wherein the API is further configured to:
receive a plurality of user-generated media recordings, wherein each of the plurality of user-generated media recordings is associated with different media shows hosted by different private-end users;

store first user-generated media recordings associated with a first host of the media broadcast in a first storage location; and
store second user-generated media recordings associated with a second host of the media broadcast in a second storage location.

\* \* \* \* \*